(12) United States Patent
Brinlee

(10) Patent No.: US 9,077,248 B2
(45) Date of Patent: Jul. 7, 2015

(54) START-UP CIRCUIT FOR A POWER ADAPTER

(75) Inventor: Antony Brinlee, Plano, TX (US)

(73) Assignee: Power Systems Technologies Ltd, Ebene (MU)

( * ) Notice: Subject to any disclaimer, the term of this patent is extended or adjusted under 35 U.S.C. 154(b) by 552 days.

(21) Appl. No.: 13/541,523

(22) Filed: Jul. 3, 2012

(65) Prior Publication Data

US 2012/0294048 A1 Nov. 22, 2012

Related U.S. Application Data

(63) Continuation-in-part of application No. 12/486,493, filed on Jun. 17, 2009, now Pat. No. 8,643,222.

(51) Int. Cl.
*H02M 3/335* (2006.01)
*H02M 1/36* (2007.01)
*H01H 9/54* (2006.01)

(52) U.S. Cl.
CPC ............ *H02M 3/33507* (2013.01); *H02M 1/36* (2013.01)

(58) Field of Classification Search
USPC ....................................................... 307/140
See application file for complete search history.

(56) References Cited

U.S. PATENT DOCUMENTS

| | | | |
|---|---|---|---|
| 1,376,978 A | 5/1921 | Stoekle | |
| 2,387,943 A | 10/1945 | Putman | |
| 2,473,662 A | 6/1949 | Pohm | |
| 3,007,060 A | 10/1961 | Guenther | |
| 3,346,798 A | 10/1967 | Dinger | |
| 3,358,210 A | 12/1967 | Grossoehme | |
| 3,433,998 A | 3/1969 | Woelber | |
| 3,484,562 A | 12/1969 | Kronfeld | |
| 3,553,620 A | 1/1971 | Cielo et al. | |
| 3,602,795 A | 8/1971 | Gunn | |
| 3,622,868 A | 11/1971 | Todt | |
| 3,681,679 A | 8/1972 | Chung | |
| 3,708,742 A | 1/1973 | Gunn | |
| 3,708,744 A | 1/1973 | Stephens et al. | |
| 4,011,498 A | 3/1977 | Hamstra | |
| 4,019,122 A | 4/1977 | Ryan | |
| 4,075,547 A | 2/1978 | Wroblewski | |
| 4,202,031 A | 5/1980 | Hesler et al. | |
| 4,257,087 A | 3/1981 | Cuk | |

(Continued)

FOREIGN PATENT DOCUMENTS

| CN | 29044689 Y | 5/2007 |
|---|---|---|
| CN | 101141099 | 3/2008 |

(Continued)

OTHER PUBLICATIONS

Power Integrations, Inc., "TOP200-4/14 TOPSwitch® Family Three-terminal Off-line PWM Switch," Internet Citation http://www.datasheet4u.com/.download.php?id=311769, Jul. 1996, XP002524650, pp. 1-16.

(Continued)

*Primary Examiner* — Robert Deberadinis
(74) *Attorney, Agent, or Firm* — Boisbrun Hofman, PLLC

(57) ABSTRACT

A start-up circuit for a power adapter and method of operating the same. In one embodiment, the power adapter includes a start-up circuit configured to provide an initial bias voltage for the power adapter. The power adapter also includes a crowbar circuit configured to turn on the start-up circuit upon loss of an ac mains voltage supplied to the power adapter.

20 Claims, 7 Drawing Sheets

(56) References Cited

U.S. PATENT DOCUMENTS

| | | |
|---|---|---|
| 4,274,071 A | 6/1981 | Pfarre |
| 4,327,348 A | 4/1982 | Hirayama |
| 4,471,423 A | 9/1984 | Hase |
| 4,499,481 A | 2/1985 | Greene |
| 4,570,174 A | 2/1986 | Huang et al. |
| 4,577,268 A | 3/1986 | Easter et al. |
| 4,581,691 A | 4/1986 | Hock |
| 4,613,841 A | 9/1986 | Roberts |
| 4,636,823 A | 1/1987 | Margalit et al. |
| 4,660,136 A | 4/1987 | Montorefano |
| 4,770,667 A | 9/1988 | Evans et al. |
| 4,770,668 A | 9/1988 | Skoultchi et al. |
| 4,780,653 A | 10/1988 | Bezos et al. |
| 4,785,387 A | 11/1988 | Lee et al. |
| 4,799,138 A | 1/1989 | Chahabadi et al. |
| 4,803,609 A | 2/1989 | Gillett et al. |
| 4,823,249 A | 4/1989 | Garcia, II |
| 4,837,496 A | 6/1989 | Erdi |
| 4,866,367 A | 9/1989 | Ridley et al. |
| 4,876,638 A | 10/1989 | Silva et al. |
| 4,887,061 A | 12/1989 | Matsumura |
| 4,899,271 A | 2/1990 | Seiersen |
| 4,903,089 A | 2/1990 | Hollis et al. |
| 4,922,400 A | 5/1990 | Cook |
| 4,962,354 A | 10/1990 | Visser et al. |
| 4,964,028 A | 10/1990 | Spataro |
| 4,999,759 A | 3/1991 | Cavagnolo et al. |
| 5,003,277 A | 3/1991 | Sokai et al. |
| 5,014,178 A | 5/1991 | Balakrishnan |
| 5,027,264 A | 6/1991 | DeDoncker et al. |
| 5,055,991 A | 10/1991 | Carroll |
| 5,068,756 A | 11/1991 | Morris et al. |
| 5,106,778 A | 4/1992 | Hollis et al. |
| 5,126,714 A | 6/1992 | Johnson |
| 5,132,888 A | 7/1992 | Lo et al. |
| 5,134,771 A | 8/1992 | Lee et al. |
| 5,172,309 A | 12/1992 | DeDoncker et al. |
| 5,177,460 A | 1/1993 | Dhyanchand et al. |
| 5,182,535 A | 1/1993 | Dhyanchand |
| 5,204,809 A | 4/1993 | Andresen |
| 5,206,621 A | 4/1993 | Yerman |
| 5,208,739 A | 5/1993 | Sturgeon |
| 5,223,449 A | 6/1993 | Morris et al. |
| 5,225,971 A | 7/1993 | Spreen |
| 5,231,037 A | 7/1993 | Yuan et al. |
| 5,244,829 A | 9/1993 | Kim |
| 5,262,930 A | 11/1993 | Hua et al. |
| 5,282,126 A | 1/1994 | Husgen |
| 5,285,396 A | 2/1994 | Aoyama |
| 5,291,382 A | 3/1994 | Cohen |
| 5,303,138 A | 4/1994 | Rozman |
| 5,305,191 A | 4/1994 | Loftus, Jr. |
| 5,335,163 A | 8/1994 | Seiersen |
| 5,336,985 A | 8/1994 | McKenzie |
| 5,342,795 A | 8/1994 | Yuan et al. |
| 5,343,140 A | 8/1994 | Gegner |
| 5,353,001 A | 10/1994 | Meinel et al. |
| 5,369,042 A | 11/1994 | Morris et al. |
| 5,374,887 A | 12/1994 | Drobnik |
| 5,399,968 A | 3/1995 | Sheppard et al. |
| 5,407,842 A | 4/1995 | Morris et al. |
| 5,453,923 A | 9/1995 | Scalais et al. |
| 5,459,652 A | 10/1995 | Faulk |
| 5,468,661 A | 11/1995 | Yuan et al. |
| 5,477,175 A | 12/1995 | Tisinger et al. |
| 5,508,903 A | 4/1996 | Alexndrov |
| 5,523,673 A | 6/1996 | Ratliff et al. |
| 5,539,630 A | 7/1996 | Pietkiewicz et al. |
| 5,554,561 A | 9/1996 | Plumton |
| 5,555,494 A | 9/1996 | Morris |
| 5,581,224 A | 12/1996 | Yamaguchi |
| 5,610,085 A | 3/1997 | Yuan et al. |
| 5,624,860 A | 4/1997 | Plumton et al. |
| 5,636,116 A | 6/1997 | Milavec et al. |
| 5,661,642 A | 8/1997 | Shimashita |
| 5,663,876 A | 9/1997 | Newton et al. |
| 5,671,131 A | 9/1997 | Brown |
| 5,700,703 A | 12/1997 | Huang et al. |
| 5,712,189 A | 1/1998 | Plumton et al. |
| 5,719,544 A | 2/1998 | Vinciarelli et al. |
| 5,734,564 A | 3/1998 | Brkovic |
| 5,736,842 A | 4/1998 | Jovanovic |
| 5,742,491 A | 4/1998 | Bowman et al. |
| 5,747,842 A | 5/1998 | Plumton |
| 5,756,375 A | 5/1998 | Celii et al. |
| 5,760,671 A | 6/1998 | Lahr et al. |
| 5,783,984 A | 7/1998 | Keuneke |
| 5,784,266 A | 7/1998 | Chen |
| 5,804,943 A | 9/1998 | Kollman et al. |
| 5,815,383 A | 9/1998 | Lei |
| 5,815,386 A | 9/1998 | Gordon |
| 5,864,110 A | 1/1999 | Moriguchi et al. |
| 5,870,296 A | 2/1999 | Schaffer |
| 5,870,299 A | 2/1999 | Rozman |
| 5,880,942 A | 3/1999 | Leu |
| 5,886,508 A | 3/1999 | Jutras |
| 5,889,298 A | 3/1999 | Plumton et al. |
| 5,889,660 A | 3/1999 | Taranowski et al. |
| 5,900,822 A | 5/1999 | Sand et al. |
| 5,907,481 A | 5/1999 | Särdsjö |
| 5,909,110 A | 6/1999 | Yuan et al. |
| 5,910,665 A | 6/1999 | Plumton et al. |
| 5,920,475 A | 7/1999 | Boylan et al. |
| 5,925,088 A | 7/1999 | Nasu |
| 5,929,665 A | 7/1999 | Ichikawa et al. |
| 5,933,338 A | 8/1999 | Wallace |
| 5,940,287 A | 8/1999 | Brkovic |
| 5,946,207 A | 8/1999 | Schoofs |
| 5,956,245 A | 9/1999 | Rozman |
| 5,956,578 A | 9/1999 | Weitzel et al. |
| 5,959,850 A | 9/1999 | Lim |
| 5,977,853 A | 11/1999 | Ooi et al. |
| 5,982,640 A | 11/1999 | Naveed |
| 5,999,066 A | 12/1999 | Saito et al. |
| 5,999,429 A | 12/1999 | Brown |
| 6,003,139 A | 12/1999 | McKenzie |
| 6,008,519 A | 12/1999 | Yuan et al. |
| 6,011,703 A | 1/2000 | Boylan et al. |
| 6,038,154 A | 3/2000 | Boylan et al. |
| 6,046,664 A | 4/2000 | Weller et al. |
| 6,055,166 A | 4/2000 | Jacobs et al. |
| 6,060,943 A | 5/2000 | Jansen |
| 6,067,237 A | 5/2000 | Nguyen |
| 6,069,798 A | 5/2000 | Liu |
| 6,069,799 A | 5/2000 | Bowman et al. |
| 6,078,510 A | 6/2000 | Spampinato et al. |
| 6,084,792 A | 7/2000 | Chen et al. |
| 6,094,038 A | 7/2000 | Lethellier |
| 6,097,046 A | 8/2000 | Plumton |
| 6,125,046 A | 9/2000 | Jang et al. |
| 6,144,187 A | 11/2000 | Bryson |
| 6,147,886 A | 11/2000 | Wittenbreder |
| 6,156,611 A | 12/2000 | Lan et al. |
| 6,160,374 A | 12/2000 | Hayes et al. |
| 6,160,721 A | 12/2000 | Kossives et al. |
| 6,163,466 A | 12/2000 | Davila, Jr. et al. |
| 6,181,231 B1 | 1/2001 | Bartilson |
| 6,188,586 B1 | 2/2001 | Farrington et al. |
| 6,191,964 B1 | 2/2001 | Boylan et al. |
| 6,208,535 B1 | 3/2001 | Parks |
| 6,215,290 B1 | 4/2001 | Yang et al. |
| 6,218,891 B1 | 4/2001 | Lotfi et al. |
| 6,229,197 B1 | 5/2001 | Plumton et al. |
| 6,262,564 B1 | 7/2001 | Kanamori |
| 6,288,501 B1 | 9/2001 | Nakamura et al. |
| 6,288,920 B1 | 9/2001 | Jacobs et al. |
| 6,295,217 B1 | 9/2001 | Yang et al. |
| 6,304,460 B1 | 10/2001 | Cuk |
| 6,309,918 B1 | 10/2001 | Huang et al. |
| 6,317,021 B1 | 11/2001 | Jansen |
| 6,317,337 B1 | 11/2001 | Yasumura |
| 6,320,490 B1 | 11/2001 | Clayton |
| 6,323,090 B1 | 11/2001 | Zommer |
| 6,325,035 B1 | 12/2001 | Codina et al. |

(56) References Cited

U.S. PATENT DOCUMENTS

| | | |
|---|---|---|
| 6,344,986 B1 | 2/2002 | Jain et al. |
| 6,345,364 B1 | 2/2002 | Lee |
| 6,348,848 B1 | 2/2002 | Herbert |
| 6,351,396 B1 | 2/2002 | Jacobs |
| 6,356,462 B1 | 3/2002 | Jang et al. |
| 6,362,986 B1 | 3/2002 | Schultz et al. |
| 6,373,727 B1 | 4/2002 | Hedenskog et al. |
| 6,373,734 B1 | 4/2002 | Martinelli |
| 6,380,836 B2 | 4/2002 | Matsumoto et al. |
| 6,388,898 B1 | 5/2002 | Fan et al. |
| 6,392,902 B1 | 5/2002 | Jang et al. |
| 6,396,718 B1 | 5/2002 | Ng et al. |
| 6,400,579 B2 | 6/2002 | Cuk |
| 6,414,578 B1 | 7/2002 | Jitaru |
| 6,418,039 B2 | 7/2002 | Lentini et al. |
| 6,438,009 B2 | 8/2002 | Assow |
| 6,445,598 B1 | 9/2002 | Yamada |
| 6,462,965 B1 | 10/2002 | Uesono |
| 6,466,461 B2 | 10/2002 | Mao et al. |
| 6,469,564 B1 | 10/2002 | Jansen |
| 6,477,065 B2 | 11/2002 | Parks |
| 6,483,724 B1 | 11/2002 | Blair et al. |
| 6,489,754 B2 | 12/2002 | Blom |
| 6,498,367 B1 | 12/2002 | Chang et al. |
| 6,501,193 B1 | 12/2002 | Krugly |
| 6,504,321 B2 | 1/2003 | Giannopoulos et al. |
| 6,512,352 B2 | 1/2003 | Qian |
| 6,525,603 B1 | 2/2003 | Morgan |
| 6,539,299 B2 | 3/2003 | Chatfield et al. |
| 6,545,453 B2 | 4/2003 | Glinkowski et al. |
| 6,548,992 B1 | 4/2003 | Alcantar et al. |
| 6,549,436 B1 | 4/2003 | Sun |
| 6,552,917 B1 | 4/2003 | Bourdillon |
| 6,563,725 B2 | 5/2003 | Carsten |
| 6,570,268 B1 | 5/2003 | Perry et al. |
| 6,580,627 B2 | 6/2003 | Toshio |
| 6,597,588 B2 | 7/2003 | Matsumoto |
| 6,597,592 B2 | 7/2003 | Carsten |
| 6,608,768 B2 | 8/2003 | Sula |
| 6,611,132 B2 | 8/2003 | Nakagawa et al. |
| 6,614,206 B1 | 9/2003 | Wong et al. |
| 6,636,025 B1 | 10/2003 | Irissou |
| 6,654,259 B2 | 11/2003 | Koshita et al. |
| 6,661,276 B1 | 12/2003 | Chang |
| 6,668,296 B1 | 12/2003 | Dougherty et al. |
| 6,674,658 B2 | 1/2004 | Mao et al. |
| 6,683,797 B2 | 1/2004 | Zaitsu et al. |
| 6,687,137 B1 | 2/2004 | Yasumura |
| 6,696,910 B2 | 2/2004 | Nuytkens et al. |
| 6,731,486 B2 | 5/2004 | Holt et al. |
| 6,741,099 B1 | 5/2004 | Krugly |
| 6,751,106 B2 | 6/2004 | Zhang et al. |
| 6,753,723 B2 | 6/2004 | Zhang |
| 6,765,810 B2 | 7/2004 | Perry |
| 6,775,159 B2 | 8/2004 | Webb et al. |
| 6,784,644 B2 | 8/2004 | Xu et al. |
| 6,804,125 B2 | 10/2004 | Brkovic |
| 6,813,170 B2 | 11/2004 | Yang |
| 6,831,847 B2 | 12/2004 | Perry |
| 6,856,149 B2 | 2/2005 | Yang |
| 6,862,194 B2 | 3/2005 | Yang et al. |
| 6,867,678 B2 | 3/2005 | Yang |
| 6,867,986 B2 | 3/2005 | Amei |
| 6,873,237 B2 | 3/2005 | Chandrasekaran et al. |
| 6,882,548 B1 | 4/2005 | Jacobs et al. |
| 6,906,934 B2 | 6/2005 | Yang et al. |
| 6,943,553 B2 | 9/2005 | Zimmermann et al. |
| 6,944,033 B1 | 9/2005 | Xu et al. |
| 6,977,824 B1 | 12/2005 | Yang et al. |
| 6,980,077 B1 | 12/2005 | Chandrasekaran et al. |
| 6,982,887 B2 | 1/2006 | Batarseh et al. |
| 7,009,486 B1 | 3/2006 | Goeke et al. |
| 7,012,414 B1 | 3/2006 | Mehrotra et al. |
| 7,016,204 B2 | 3/2006 | Yang et al. |
| 7,026,807 B2 | 4/2006 | Anderson et al. |
| 7,034,586 B2 | 4/2006 | Mehas et al. |
| 7,034,647 B2 | 4/2006 | Yan et al. |
| 7,046,523 B2 | 5/2006 | Sun et al. |
| 7,061,358 B1 | 6/2006 | Yang |
| 7,072,189 B2 | 7/2006 | Kim |
| 7,075,799 B2 | 7/2006 | Qu |
| 7,076,360 B1 | 7/2006 | Ma |
| 7,095,638 B2 | 8/2006 | Uusitalo |
| 7,098,640 B2 | 8/2006 | Brown |
| 7,099,163 B1 | 8/2006 | Ying |
| 7,148,669 B2 | 12/2006 | Maksimovic et al. |
| 7,170,268 B2 | 1/2007 | Kim |
| 7,176,662 B2 | 2/2007 | Chandrasekaran |
| 7,209,024 B2 | 4/2007 | Nakahori |
| 7,269,038 B2 | 9/2007 | Shekhawat et al. |
| 7,280,026 B2 | 10/2007 | Chandrasekaran et al. |
| 7,285,807 B2 | 10/2007 | Brar et al. |
| 7,298,118 B2 | 11/2007 | Chandrasekaran |
| 7,301,785 B2 | 11/2007 | Yasumura |
| 7,312,686 B2 | 12/2007 | Bruno |
| 7,321,283 B2 | 1/2008 | Mehrotra et al. |
| 7,332,992 B2 | 2/2008 | Iwai |
| 7,339,208 B2 | 3/2008 | Brar et al. |
| 7,339,801 B2 | 3/2008 | Yasumura |
| 7,348,612 B2 | 3/2008 | Sriram et al. |
| 7,360,004 B2 | 4/2008 | Dougherty et al. |
| 7,362,592 B2 | 4/2008 | Yang et al. |
| 7,362,593 B2 | 4/2008 | Yang et al. |
| 7,375,607 B2 | 5/2008 | Lee et al. |
| 7,375,994 B2 | 5/2008 | Andreycak |
| 7,385,375 B2 | 6/2008 | Rozman |
| 7,386,404 B2 | 6/2008 | Cargonja et al. |
| 7,417,875 B2 | 8/2008 | Chandrasekaran et al. |
| 7,427,910 B2 | 9/2008 | Mehrotra et al. |
| 7,431,862 B2 | 10/2008 | Mehrotra et al. |
| 7,439,556 B2 | 10/2008 | Brar et al. |
| 7,439,557 B2 | 10/2008 | Brar et al. |
| 7,446,512 B2 | 11/2008 | Nishihara et al. |
| 7,447,049 B2 | 11/2008 | Garner et al. |
| 7,462,891 B2 | 12/2008 | Brar et al. |
| 7,468,649 B2 | 12/2008 | Chandrasekaran |
| 7,471,523 B2 | 12/2008 | Yang |
| 7,471,527 B2 | 12/2008 | Chen |
| 7,489,225 B2 | 2/2009 | Dadafshar |
| 7,499,295 B2 | 3/2009 | Indika de Silva et al. |
| 7,541,640 B2 | 6/2009 | Brar et al. |
| 7,554,430 B2 | 6/2009 | Mehrotra et al. |
| 7,558,037 B1 | 7/2009 | Gong et al. |
| 7,558,082 B2 | 7/2009 | Jitaru |
| 7,567,445 B2 | 7/2009 | Coulson et al. |
| 7,583,555 B2 | 9/2009 | Kang et al. |
| 7,626,370 B1 | 12/2009 | Mei et al. |
| 7,630,219 B2 | 12/2009 | Lee |
| 7,633,369 B2 | 12/2009 | Chandrasekaran et al. |
| 7,663,183 B2 | 2/2010 | Brar et al. |
| 7,667,986 B2 | 2/2010 | Artusi et al. |
| 7,675,758 B2 | 3/2010 | Artusi et al. |
| 7,675,759 B2 | 3/2010 | Artusi et al. |
| 7,675,764 B2 | 3/2010 | Chandrasekaran et al. |
| 7,715,217 B2 | 5/2010 | Manabe et al. |
| 7,733,679 B2 | 6/2010 | Luger et al. |
| 7,746,041 B2 | 6/2010 | Xu et al. |
| 7,778,050 B2 | 8/2010 | Yamashita |
| 7,778,051 B2 | 8/2010 | Yang |
| 7,787,264 B2 | 8/2010 | Yang et al. |
| 7,791,903 B2 | 9/2010 | Zhang et al. |
| 7,795,849 B2 | 9/2010 | Sohma |
| 7,813,101 B2 | 10/2010 | Morikawa |
| 7,847,535 B2 | 12/2010 | Meynard et al. |
| 7,889,517 B2 | 2/2011 | Artusi et al. |
| 7,889,521 B2 | 2/2011 | Hsu |
| 7,906,941 B2 | 3/2011 | Jayaraman et al. |
| 7,940,035 B2 | 5/2011 | Yang |
| 7,965,528 B2 | 6/2011 | Yang et al. |
| 7,983,063 B2 | 7/2011 | Lu et al. |
| 8,004,112 B2 | 8/2011 | Koga et al. |
| 8,134,443 B2 | 3/2012 | Chandrasekaran et al. |
| 8,179,699 B2 | 5/2012 | Tumminaro et al. |
| 8,184,456 B1 | 5/2012 | Jain et al. |

(56) References Cited

U.S. PATENT DOCUMENTS

| | | |
|---|---|---|
| 8,278,889 B2 | 10/2012 | Tateishi |
| 8,467,199 B2 | 6/2013 | Lee et al. |
| 8,488,355 B2 | 7/2013 | Berghegger |
| 8,520,414 B2 | 8/2013 | Garrity et al. |
| 8,520,420 B2 | 8/2013 | Jungreis et al. |
| 8,638,578 B2 | 1/2014 | Zhang |
| 8,643,222 B2 | 2/2014 | Brinlee et al. |
| 8,767,418 B2 | 7/2014 | Jungreis et al. |
| 8,787,043 B2 | 7/2014 | Berghegger |
| 8,792,256 B2 | 7/2014 | Berghegger |
| 2001/0020886 A1 | 9/2001 | Matsumoto et al. |
| 2001/0024373 A1 | 9/2001 | Cuk |
| 2001/0055216 A1 | 12/2001 | Shirato |
| 2002/0044463 A1 | 4/2002 | Bontempo et al. |
| 2002/0057080 A1 | 5/2002 | Telefus et al. |
| 2002/0071295 A1 | 6/2002 | Nishikawa |
| 2002/0101741 A1 | 8/2002 | Brkovic |
| 2002/0110005 A1 | 8/2002 | Mao et al. |
| 2002/0114172 A1 | 8/2002 | Webb et al. |
| 2002/0167385 A1 | 11/2002 | Ackermann |
| 2002/0176262 A1 | 11/2002 | Tripathi et al. |
| 2003/0026115 A1 | 2/2003 | Miyazaki |
| 2003/0030422 A1 | 2/2003 | Sula |
| 2003/0039129 A1 | 2/2003 | Miyazaki et al. |
| 2003/0063483 A1 | 4/2003 | Carsten |
| 2003/0063484 A1 | 4/2003 | Carsten |
| 2003/0076079 A1 | 4/2003 | Alcantar et al. |
| 2003/0086279 A1 | 5/2003 | Bourdillon |
| 2003/0197585 A1 | 10/2003 | Chandrasekaran et al. |
| 2003/0198067 A1 | 10/2003 | Sun et al. |
| 2004/0017689 A1 | 1/2004 | Zhang et al. |
| 2004/0032754 A1 | 2/2004 | Yang |
| 2004/0034555 A1 | 2/2004 | Dismukes et al. |
| 2004/0064621 A1 | 4/2004 | Dougherty et al. |
| 2004/0148047 A1 | 7/2004 | Dismukes et al. |
| 2004/0156220 A1 | 8/2004 | Kim et al. |
| 2004/0174147 A1 | 9/2004 | Vinciarelli |
| 2004/0200631 A1 | 10/2004 | Chen |
| 2004/0217794 A1 | 11/2004 | Strysko |
| 2005/0024179 A1 | 2/2005 | Chandrasekaran et al. |
| 2005/0046404 A1 | 3/2005 | Uusitalo |
| 2005/0052224 A1 | 3/2005 | Yang et al. |
| 2005/0052886 A1 | 3/2005 | Yang et al. |
| 2005/0207189 A1 | 9/2005 | Chen |
| 2005/0245658 A1 | 11/2005 | Mehrotra et al. |
| 2005/0254266 A1 | 11/2005 | Jitaru |
| 2005/0254268 A1 | 11/2005 | Reinhard et al. |
| 2005/0281058 A1 | 12/2005 | Batarseh et al. |
| 2005/0286270 A1 | 12/2005 | Petkov et al. |
| 2006/0006975 A1 | 1/2006 | Jitaru et al. |
| 2006/0006976 A1 | 1/2006 | Bruno |
| 2006/0007713 A1 | 1/2006 | Brown |
| 2006/0038549 A1 | 2/2006 | Mehrotra et al. |
| 2006/0038649 A1 | 2/2006 | Mehrotra et al. |
| 2006/0038650 A1 | 2/2006 | Mehrotra et al. |
| 2006/0044845 A1 | 3/2006 | Fahlenkamp |
| 2006/0091430 A1 | 5/2006 | Sriram et al. |
| 2006/0109698 A1 | 5/2006 | Qu |
| 2006/0187684 A1 | 8/2006 | Chandrasekaran et al. |
| 2006/0197510 A1 | 9/2006 | Chandrasekaran |
| 2006/0198173 A1 | 9/2006 | Rozman |
| 2006/0226477 A1 | 10/2006 | Brar et al. |
| 2006/0226478 A1 | 10/2006 | Brar et al. |
| 2006/0227576 A1 | 10/2006 | Yasumura |
| 2006/0237968 A1 | 10/2006 | Chandrasekaran |
| 2006/0255360 A1 | 11/2006 | Brar et al. |
| 2006/0271315 A1 | 11/2006 | Cargonja et al. |
| 2006/0286865 A1 | 12/2006 | Chou et al. |
| 2007/0007945 A1 | 1/2007 | King et al. |
| 2007/0010298 A1 | 1/2007 | Chang |
| 2007/0019356 A1 | 1/2007 | Morikawa |
| 2007/0030717 A1 | 2/2007 | Luger et al. |
| 2007/0041224 A1 | 2/2007 | Moyse et al. |
| 2007/0045765 A1 | 3/2007 | Brar et al. |
| 2007/0058402 A1 | 3/2007 | Shekhawat et al. |
| 2007/0069286 A1 | 3/2007 | Brar et al. |
| 2007/0114979 A1 | 5/2007 | Chandrasekaran |
| 2007/0120953 A1 | 5/2007 | Koga et al. |
| 2007/0121351 A1 | 5/2007 | Zhang et al. |
| 2007/0139984 A1 | 6/2007 | Lo |
| 2007/0159857 A1 | 7/2007 | Lee |
| 2007/0206523 A1 | 9/2007 | Huynh et al. |
| 2007/0222463 A1 | 9/2007 | Qahouq et al. |
| 2007/0241721 A1 | 10/2007 | Weinstein et al. |
| 2007/0274106 A1 | 11/2007 | Coulson et al. |
| 2007/0274107 A1 | 11/2007 | Garner et al. |
| 2007/0296028 A1 | 12/2007 | Brar et al. |
| 2007/0296383 A1 | 12/2007 | Xu et al. |
| 2007/0298559 A1 | 12/2007 | Brar et al. |
| 2007/0298564 A1 | 12/2007 | Brar et al. |
| 2008/0012423 A1 | 1/2008 | Mimran |
| 2008/0024094 A1 | 1/2008 | Nishihara et al. |
| 2008/0024259 A1 | 1/2008 | Chandrasekaran et al. |
| 2008/0030178 A1 | 2/2008 | Leonard et al. |
| 2008/0031021 A1 | 2/2008 | Ros et al. |
| 2008/0037294 A1 | 2/2008 | Indika de Silva et al. |
| 2008/0043503 A1 | 2/2008 | Yang |
| 2008/0054874 A1 | 3/2008 | Chandrasekaran et al. |
| 2008/0061746 A1 | 3/2008 | Kobayashi et al. |
| 2008/0080219 A1 | 4/2008 | Sohma |
| 2008/0111657 A1 | 5/2008 | Mehrotra et al. |
| 2008/0130321 A1 | 6/2008 | Artusi et al. |
| 2008/0130322 A1 | 6/2008 | Artusi et al. |
| 2008/0137381 A1 | 6/2008 | Beasley |
| 2008/0150666 A1 | 6/2008 | Chandrasekaran et al. |
| 2008/0198638 A1 | 8/2008 | Reinberger et al. |
| 2008/0205104 A1 | 8/2008 | Lev et al. |
| 2008/0224812 A1 | 9/2008 | Chandrasekaran |
| 2008/0232141 A1 | 9/2008 | Artusi et al. |
| 2008/0298106 A1 | 12/2008 | Tateishi |
| 2008/0310190 A1 | 12/2008 | Chandrasekaran et al. |
| 2008/0315852 A1 | 12/2008 | Jayaraman et al. |
| 2008/0316779 A1 | 12/2008 | Jayaraman et al. |
| 2009/0002054 A1 | 1/2009 | Tsunoda et al. |
| 2009/0046486 A1 | 2/2009 | Lu et al. |
| 2009/0072626 A1 | 3/2009 | Watanabe et al. |
| 2009/0097290 A1 | 4/2009 | Chandrasekaran |
| 2009/0109711 A1 | 4/2009 | Hsu |
| 2009/0257250 A1 | 10/2009 | Liu |
| 2009/0273957 A1 | 11/2009 | Feldtkeller |
| 2009/0284994 A1 | 11/2009 | Lin et al. |
| 2009/0289557 A1 | 11/2009 | Itoh et al. |
| 2009/0290385 A1 | 11/2009 | Jungreis et al. |
| 2009/0310388 A1 | 12/2009 | Yang |
| 2009/0315530 A1 | 12/2009 | Baranwal |
| 2010/0020578 A1 | 1/2010 | Ryu et al. |
| 2010/0054000 A1 | 3/2010 | Huynh |
| 2010/0066336 A1 | 3/2010 | Araki et al. |
| 2010/0091522 A1 | 4/2010 | Chandrasekaran et al. |
| 2010/0123486 A1 | 5/2010 | Berghegger |
| 2010/0149838 A1 | 6/2010 | Artusi et al. |
| 2010/0164400 A1 | 7/2010 | Adragna |
| 2010/0164443 A1 | 7/2010 | Tumminaro et al. |
| 2010/0182806 A1 | 7/2010 | Garrity et al. |
| 2010/0188876 A1 | 7/2010 | Garrity et al. |
| 2010/0219802 A1 | 9/2010 | Lin et al. |
| 2010/0254168 A1 | 10/2010 | Chandrasekaran |
| 2010/0321958 A1 | 12/2010 | Brinlee et al. |
| 2010/0321964 A1 | 12/2010 | Brinlee et al. |
| 2011/0025289 A1 | 2/2011 | Wang et al. |
| 2011/0038179 A1 | 2/2011 | Zhang |
| 2011/0062926 A1 | 3/2011 | Qiu et al. |
| 2011/0080102 A1 | 4/2011 | Ge et al. |
| 2011/0089917 A1 | 4/2011 | Chen et al. |
| 2011/0095730 A1 | 4/2011 | Strijker et al. |
| 2011/0134664 A1 | 6/2011 | Berghegger |
| 2011/0149607 A1 | 6/2011 | Jungreis et al. |
| 2011/0182089 A1 | 7/2011 | Berghegger |
| 2011/0239008 A1 | 9/2011 | Lam et al. |
| 2011/0241738 A1 | 10/2011 | Tamaoka |
| 2011/0305047 A1 | 12/2011 | Jungreis et al. |
| 2012/0020119 A1 | 1/2012 | Tang et al. |
| 2012/0243271 A1 | 9/2012 | Berghegger |
| 2012/0250378 A1 | 10/2012 | Kok et al. |

(56) References Cited

U.S. PATENT DOCUMENTS

| | | |
|---|---|---|
| 2012/0294048 A1 | 11/2012 | Brinlee |
| 2013/0003430 A1 | 1/2013 | Reddy |
| 2013/0229829 A1 | 9/2013 | Zhang et al. |
| 2013/0250627 A1 | 9/2013 | Herfurth |
| 2014/0091720 A1 | 4/2014 | Brinlee |
| 2014/0254215 A1 | 9/2014 | Brinlee et al. |
| 2014/0301111 A1 | 10/2014 | Jungreis et al. |

FOREIGN PATENT DOCUMENTS

| | | |
|---|---|---|
| CN | 101202509 | 6/2008 |
| CN | 201252294 | 6/2009 |
| DE | 10112820 A1 | 10/2002 |
| DE | 10310361 A1 | 9/2004 |
| DE | 10352509 A1 | 6/2005 |
| DE | 102013104899 A1 | 11/2014 |
| EP | 0 665 634 A1 | 1/1994 |
| JP | 57097361 | 6/1982 |
| JP | 3-215911 | 9/1991 |
| JP | 2000-68132 | 3/2000 |
| JP | 2008283818 A | 11/2008 |
| WO | WO8700991 | 2/1987 |
| WO | 03088463 A1 | 10/2003 |
| WO | WO 2010/083511 A1 | 7/2010 |
| WO | WO 2010/083514 A1 | 7/2010 |
| WO | WO 2010/114914 A1 | 10/2010 |
| WO | WO 2011/116225 A1 | 9/2011 |

OTHER PUBLICATIONS

Bill Andreycak, Active Clamp and Reset Technique Enhances Forward Converter Performance, Oct. 1994, Texas Instruments, 19 pages.

Ridley, R., Designing with the TL431, Switching Power Magazine, Designer Series XV, pp. 1-5, 2005.

Ajram, S., et al., "Ultrahigh Frequency DC-to-DC Converters Using GaAs Power Switches," IEEE Transactions on Power Electronics, Sep. 2001, pp. 594-602, vol. 16, No. 5, IEEE, Los Alamitos, CA.

"AN100: Application Note using Lx100 Family of High Performance N-Ch JFET Transistors," AN100.Rev 1.01, Sep. 2003, 5 pp., Lovoltech, Inc., Santa Clara, CA.

"AN101A: Gate Drive Network for a Power JFET," AN101A.Rev 1.2, Nov. 2003, 2 pp., Lovoltech, Inc., Santa Clara, CA.

"AN108: Applications Note: How to Use Power JFETs® and MOSFETs Interchangeably in Low-Side Applications," Rev. 1.0.1, Feb. 14, 2005, 4 pp., Lovoltech, Inc., Santa Clara, CA.

Balogh, L., et al., "Power-Factor Correction with Interleaved Boost Converters in Continuous-Inductor-Current Mode," IEEE Proceedings of APEC, pp. 168-174, 1993, IEEE, Los Alamitos, CA.

Biernacki, J., et al., "Radio Frequency DC-DC Flyback Converter," Proceedings of the 43rd IEEE Midwest Symposium on Circuits and Systems, Aug. 8-11, 2000, pp. 94-97, vol. 1, IEEE, Los Alamitos, CA.

Chen, W., et al., "Design of High Efficiency, Low Profile, Low Voltage Converter with Integrated Magnetics," Proceedings of 1997 IEEE Applied Power Electronics Conference (APEC '97), 1997, pp. 911-917, IEEE, Los Alamitos, CA.

Chen, W., et al., "Integrated Planar Inductor Scheme for Multi-module Interleaved Quasi-Square-Wave (QSW) DC/DC Converter," 30th Annual IEEE Power Electronics Specialists Conference (PESC '99), 1999, pp. 759-762, vol. 2, IEEE, Los Alamitos, CA.

Curtis, K., "Advances in Microcontroller Peripherals Facilitate Current-Mode for Digital Power Supplies," Digital Power Forum '06, 4 pp., Sep. 2006, Darnell Group, Richardson, TX.

Eisenbeiser, K., et al., "Manufacturable GaAs VFET for Power Switching Applications," IEEE Electron Device Letters, Apr. 2000, pp. 144-145, vol. 21, No. 4, IEEE.

Gaye, M., et al., "A 50-100MHz 5V to -5V, 1W Cuk Converter Using Gallium Arsenide Power Switches," ISCAS 2000—IEEE International Symposium on Circuits and Systems, May 28-31, 2000, pp. I-264-I-267, vol. 1, IEEE, Geneva, Switzerland.

Goldberg, A.F., et al., "Issues Related to 1-10-MHz Transformer Design," IEEE Transactions on Power Electronics, Jan. 1989, pp. 113-123, vol. 4, No. 1, IEEE, Los Alamitos, CA.

Goldberg, A.F., et al., "Finite-Element Analysis of Copper Loss in 1-10-MHz Transformers," IEEE Transactions on Power Electronics, Apr. 1989, pp. 157-167, vol. 4, No. 2, IEEE, Los Alamitos, CA.

Jitaru, I.D., et al., "Quasi-Integrated Magnetic an Avenue for Higher Power Density and Efficiency in Power Converters," 12th Annual Applied Power Electronics Conference and Exposition, Feb. 23-27, 1997, pp. 395-402, vol. 1, IEEE, Los Alamitos, CA.

Kollman, R., et al., "10 MHz PWM Converters with GaAs VFETs," IEEE 11th Annual Applied Power Electronics Conference and Exposition, Mar. 1996, pp. 264-269, vol. 1, IEEE.

Lee, P.-W., et al., "Steady-State Analysis of an Interleaved Boost Converter with Coupled Inductors," IEEE Transactions on Industrial Electronics, Aug. 2000, pp. 787-795, vol. 47, No. 4, IEEE, Los Alamitos, CA.

Lenk, R., "Introduction to the Tapped Buck Converter," PCIM 2000, HFPC 2000 Proceedings, Oct. 2000, pp. 155-166.

Liu, W., "Fundamentals of III-V Devices: HBTs, MESFETs, and HFETs/HEMTs," §5-5: Modulation Doping, 1999, pp. 323-330, John Wiley & Sons, New York, NY.

Maksimović, D., et al., "Switching Converters with Wide DC Conversion Range," IEEE Transactions on Power Electronics, Jan. 1991, pp. 151-157, vol. 6, No. 1, IEEE, Los Alamitos, CA.

Middlebrook, R.D., "Transformerless DC-to-DC Converters with Large Conversion Ratios," IEEE Transactions on Power Electronics, Oct. 1988, pp. 484-488, vol. 3, No. 4, IEEE, Los Alamitos, CA.

Miwa, B.A., et al., "High Efficiency Power Factor Correction Using Interleaving Techniques," IEEE Proceedings of APEC, 1992, pp. 557-568, IEEE, Los Alamitos, CA.

Nguyen, L.D., et al., "Ultra-High-Speed Modulation-Doped Field-Effect Transistors: A Tutorial Review," Proceedings of the IEEE, Apr. 1992, pp. 494-518, vol. 80, No. 4, IEEE.

Niemela, V.A., et al., "Comparison of GaAs and Silicon Synchronous Rectifiers in a 3.3V Out, 50W DC-DC Converter," 27th Annual IEEE Power Electronics Specialists Conference, Jun. 1996, pp. 861-867, vol. 1, IEEE.

Ninomiya, T., et al., "Static and Dynamic Analysis of Zero-Voltage-Switched Half-Bridge Converter with PWM Control," Proceedings of 1991 IEEE Power Electronics Specialists Conference (PESC '91), 1991, pp. 230-237, IEEE, Los Alamitos, CA.

O'Meara, K., "A New Output Rectifier Configuration Optimized for High Frequency Operation," Proceedings of 1991 High Frequency Power Conversion (HPFC '91) Conference, Jun. 1991, pp. 219-225, Toronto, CA.

Peng, C., et al., "A New Efficient High Frequency Rectifier Circuit," Proceedings of 1991 High Frequency Power Conversion (HFPC '91) Conference, Jun. 1991, pp. 236-243, Toronto, CA.

Pietkiewicz, A., et al. "Coupled-Inductor Current-Doubler Topology in Phase-Shifted Full-Bridge DC-DC Converter," 20th International Telecommunications Energy Conference (INTELEC), Oct. 1998, pp. 41-48, IEEE, Los Alamitos, CA.

Plumton, D.L., et al., "A Low On-Resistance High-Current GaAs Power VFET," IEEE Electron Device Letters, Apr. 1995, pp. 142-144, vol. 16, No. 4, IEEE.

Rajeev, M., "An Input Current Shaper with Boost and Flyback Converter Using Integrated Magnetics," Power Electronics and Drive Systems, 5th International Conference on Power Electronics and Drive Systems 2003, Nov. 17-20, 2003, pp. 327-331, vol. 1, IEEE, Los Alamitos, CA.

Rico, M., et al., "Static and Dynamic Modeling of Tapped-Inductor DC-to-DC Converters," 1987, pp. 281-288, IEEE, Los Alamitos, CA.

Severns, R., "Circuit Reinvention in Power Electronics and Identification of Prior Work," Proceedings of 1997 IEEE Applied Power Electronics Conference (APEC '97), 1997, pp. 3-9, IEEE, Los Alamitos, CA.

Severns, R., "Circuit Reinvention in Power Electronics and Identification of Prior Work," IEEE Transactions on Power Electronics, Jan. 2001, pp. 1-7, vol. 16, No. 1, IEEE, Los Alamitos, CA.

(56) References Cited

OTHER PUBLICATIONS

Sun, J., et al., "Unified Analysis of Half-Bridge Converters with Current-Doubler Rectifier," Proceedings of 2001 IEEE Applied Power Electronics Conference, 2001, pp. 514-520, IEEE, Los Alamitos, CA.

Sun, J., et al., "An Improved Current-Doubler Rectifier with Integrated Magnetics," 17th Annual Applied Power Electronics Conference and Exposition (APEC), 2002, pp. 831-837, vol. 2, IEEE, Dallas, TX.

Thaker, M., et al., "Adaptive/Intelligent Control and Power Management Reduce Power Dissipation and Consumption," Digital Power Forum '06, 11 pp., Sep. 2006, Darnell Group, Richardson, TX.

Wei, J., et al., "Comparison of Three Topology Candidates for 12V VRM," IEEE APEC, 2001, pp. 245-251, IEEE, Los Alamitos, CA.

Weitzel, C.E., "RF Power Devices for Wireless Communications," 2002 IEEE MTT-S CDROM, 2002, pp. 285-288, paper TU4B-1, IEEE, Los Alamitos, CA.

Williams, R., "Modern GaAs Processing Methods," 1990, pp. 66-67, Artech House, Inc., Norwood, MA.

Wong, P.-L., et al., "Investigating Coupling Inductors in the Interleaving QSW VRM," 15th Annual Applied Power Electronics Conference and Exposition (APEC 2000), Feb. 2000, pp. 973-978, vol. 2, IEEE, Los Alamitos, CA.

Xu, P., et al., "Design and Performance Evaluation of Multi-Channel Interleaved Quasi-Square-Wave Buck Voltage Regulator Module," HFPC 2000 Proceedings, Oct. 2000, pp. 82-88.

Xu, P., et al., "Design of 48 V Voltage Regulator Modules with a Novel Integrated Magnetics," IEEE Transactions on Power Electronics, Nov. 2002, pp. 990-998, vol. 17, No. 6, IEEE, Los Alamitos, CA.

Xu, P., et al., "A Family of Novel Interleaved DC/DC Converters for Low-Voltage High-Current Voltage Regulator Module Applications," IEEE Power Electronics Specialists Conference, Jun. 2001, pp. 1507-1511, IEEE, Los Alamitos, CA.

Xu, P., et al., "A Novel Integrated Current Doubler Rectifier," IEEE 2000 Applied Power Electronics Conference, Mar. 2000, pp. 735-740, IEEE, Los Alamitos, CA.

Yan, L., et al., "Integrated Magnetic Full Wave Converter with Flexible Output Inductor," 17th Annual Applied Power Electronics Conference and Exposition (APEC), 2002, pp. 824-830, vol. 2, IEEE, Dallas, TX.

Yan, L., et al., "Integrated Magnetic Full Wave Converter with Flexible Output Inductor," IEEE Transactions on Power Electronics, Mar. 2003, pp. 670-678, vol. 18, No. 2, IEEE, Los Alamitos, CA.

Zhou, X., et al., "A High Power Density, High Efficiency and Fast Transient Voltage Regulator Module with a Novel Current Sensing and Current Sharing Technique," IEEE Applied Power Electronics Conference, Mar. 1999, pp. 289-294, IEEE, Los Alamitos, CA.

Zhou, X., et al., "Investigation of Candidate VRM Topologies for Future Microprocessors," IEEE Applied Power Electronics Conference, Mar. 1998, pp. 145-150, IEEE, Los Alamitos, CA.

Freescale Semiconductor, "Implementing a Digital AC/DC Switched-Mode Power Supply using a 56F8300 Digital Signal Controller," Application Note AN3115, Aug. 2005, 24 pp., Chandler, AZ.

Chhawchharia, P., et al., "On the Reduction of Component Count in Switched Capacitor DC/DC Convertors," Hong Kong Polytechnic University, IEEE, 1997, Hung Hom, Kowloon, Hong King, pp. 1395-1401.

Kuwabara, K., et al., "Switched-Capacitor DC-DC Converters," Fujitsu Limited, IEEE, 1988, Kawasaki, Japan, pp. 213-218.

Maxim, Application Note 725, www.maxim-ic.com/an725, Maxim Integrated Products, Nov. 29, 2001, 8 pages.

National Semiconductor Corporation, "LMC7660 Switched Capacitor Voltage Converter," www.national.com, Apr. 1997, 12 pages.

National Semiconductor Corporation, "LM2665 Switched Capacitor Voltage Converter," www.national.com, Sep. 2005, 9 pages.

Texas Instruments Incorporated "LT1054, LT1054Y Switched-Capacitor Voltage Converters With Regulators," SLVS033C, Feb. 1990—Revised Jul. 1998, 25 pages.

Vallamkonda, S., "Limitations of Switching Voltage Regulators," A Thesis in Electrical Engineering, Texas Tech University, May 2004, 89 pages.

Xu, M., et al., "Voltage Divider and its Application in the Two-stage Power Architecture," Center for Power Electronics Systems, Virginia Polytechnic Institute and State University, IEEE, 2006, Blacksburg, Virginia, pp. 499-505.

Freescale Semiconductor, "Design of a Digital AC/DC SMPS using the 56F8323 Device, Designer Reference Manual, 56800E 16-bit Digital Signal Controllers", DRM074, Rev. 0, Aug. 2005 (108 pages).

Freescale Semiconductor, "56F8323 Evaluation Module User Manual, 56F8300 16-bit Digital Signal Controllers", MC56F8323EVMUM, Rev. 2, Jul. 2005 (72 pages).

Freescale Semiconductor, "56F8323/56F8123 Data Sheet Preliminary Technical Data, 56F8300 16-bit Digital Signal Controllers," MC56F8323 Rev. 17, Apr. 2007 (140 pages).

START-UP CIRCUIT FOR A POWER ADAPTER

This application is a continuation in part of, and claims priority to, U.S. patent application Ser. No. 12/486,493, entitled "Power Adapter Employing a Power Reducer," filed on Jun. 17, 2009, which is incorporated herein by reference.

TECHNICAL FIELD

The present invention is directed, in general, to power electronics and, more specifically, to a start-up circuit for a power adapter and method of operating the same.

BACKGROUND

A switched-mode power converter (also referred to as a "power converter" or "regulator") is a power supply or power processing circuit that converts an input voltage waveform into a specified output voltage waveform. DC-DC power converters convert a direct current ("dc") input voltage into a dc output voltage. Controllers associated with the power converters manage an operation thereof by controlling conduction periods of power switches employed therein. Generally, the controllers are coupled between an input and output of the power converter in a feedback loop configuration (also referred to as a "control loop" or "closed control loop").

Typically, the controller measures an output characteristic (e.g., an output voltage, an output current, or a combination of an output voltage and an output current) of the power converter, and based thereon modifies a duty cycle of a power switch of the power converter. The duty cycle "D" is a ratio represented by a conduction period of a power switch to a switching period thereof. Thus, if a power switch conducts for half of the switching period, the duty cycle for the power switch would be 0.5 (or 50 percent). Additionally, as the voltage or the current for systems, such as a microprocessor powered by the power converter, dynamically change (e.g., as a computational load on the microprocessor changes), the controller should be configured to dynamically increase or decrease the duty cycle of the power switches therein to maintain an output characteristic such as an output voltage at a desired value.

A power converter with a low power rating designed to convert an alternating current ("ac") mains voltage to a regulated dc output voltage to power an electronic load such as a printer, modem, or personal computer is generally referred to as an "ac power adapter" or a "power adapter," or, herein succinctly, as an "adapter." Industry standards have required continual reductions in no-load power supply loss to reduce power consumed by millions of power adapters that remain plugged in, but are not in use. Efficiency requirements at very low output power levels were established in view of the typical load presented by an electronic device in an idle or sleep mode, which is an operational state for a large fraction of the time for such devices in a home or office environment.

No-load power loss of a power adapter is typically dominated by three phenomena. The first phenomenon is directed to the current drawn from high-voltage supply bus to provide power to the controller of the adapter. The high-voltage power draw is sometimes shut off when the adapter is in operation and power can be supplied from an auxiliary winding of a transformer thereof. However, in the absence of operation of the adapter (e.g., a start-up condition or in the event of complete shutdown of the controller), the high-voltage supply bus provides power to the controller directly. While the current required to start or maintain controller operation may be small, the fact that it comes from a high-voltage bus causes a higher-than-optimal draw of power from the input of the adapter.

The second phenomenon is directed to the current flow in a bleeder resistor coupled across an "X-capacitor" (i.e., a safety rated capacitor) of the adapter. An X-capacitor is a capacitor coupled across the ac input power mains (also referred to as "ac mains") to a power converter to reduce electromagnetic interference ("EMI") produced by the power converter and conducted back to the ac mains. A "Y-capacitor" (i.e., a safety rated capacitor) is an EMI-reducing capacitor coupled between ac mains to a power converter and an input-side grounding conductor. Both the X-capacitor and the Y-capacitor are distinguished by a safety voltage rating related to a peak voltage that the respective capacitor is required to sustain. Upon disconnection from the ac mains, the X-capacitor should be bled down to a low voltage in a short period of time. Bleeding down an X-capacitor voltage is typically accomplished with a bleeder resistor coupled across the capacitor.

The third phenomenon is directed to gate drive and other continuing power losses that do not vary with load. The third phenomenon is commonly addressed by using a burst-mode of operation, wherein the controller is disabled for a period of time (e.g., one second) followed by a short pulse of high-power operation (e.g., 10 milliseconds ("ms")), to provide a low average output power. The second phenomenon is commonly addressed by reducing generated EMI in various ways allowing a reduction in the size of the X-capacitor, which enables reduction of the bleeder resistor current. The first phenomenon above is not usually addressed.

Even when the controller is disabled, it still draws a small but significant amount of power. Furthermore, the bleeder resistor coupled in parallel with the X-capacitor draws continuous power regardless of load level. While the X-capacitor size can be reduced somewhat by good EMI design practices, all adapters require at least a small X-capacitor to meet EMI requirements, resulting in bleeder resistor losses at no load.

These two types of power losses, while relatively small, have now become substantial hindrances to lowering no-load losses as industry requirements become stricter each year. Thus, despite the development of numerous strategies to reduce power losses of power adapters, no strategy has emerged to provide substantial reduction of power dissipation while an adapter provides minimal or no power to a load. Accordingly, what is needed in the art is a design approach and related method for a power adapter that enable further reduction of power converter losses without compromising end-product performance, and that can be advantageously adapted to high-volume manufacturing techniques.

SUMMARY OF THE INVENTION

These and other problems are generally solved or circumvented, and technical advantages are generally achieved, by advantageous embodiments of the present invention, including a start-up circuit for a power adapter and method of operating the same. In one embodiment, the power adapter includes a start-up circuit configured to provide an initial bias voltage for the power adapter. The power adapter also includes a crowbar circuit configured to turn on the start-up circuit upon loss of an ac mains voltage supplied to the power adapter.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, reference is now made to the following descriptions taken in conjunction with the accompanying drawings, in which.

Corresponding numerals and symbols in the different figures generally refer to corresponding parts unless otherwise indicated, and may not be redescribed in the interest of brevity after the first instance. The FIGUREs are drawn to illustrate the relevant aspects of exemplary embodiments.

DETAILED DESCRIPTION OF ILLUSTRATIVE EMBODIMENTS

The making and using of the present exemplary embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to exemplary embodiments in a specific context, namely, a start-up circuit for a power adapter. While the principles of the present invention will be described in the environment of a power adapter, any application that may benefit from a power conversion device including a start-up circuit such as a power amplifier or a motor controller is well within the broad scope of the present invention.

A flyback power converter is frequently employed in low power applications such as a power adapter for a printer because of its simplicity and low cost. The power adapters employing a flyback power converter are typically designed to operate continuously at a high output power level. Recalling that the loads presented to power adapters such as loads provided by printers and personal computers are generally variable and usually do not operate for an extended period of time at a maximum power level, a consideration for the design of power adapters for such applications is power conversion efficiency at no load and at light loads.

Figure 1:
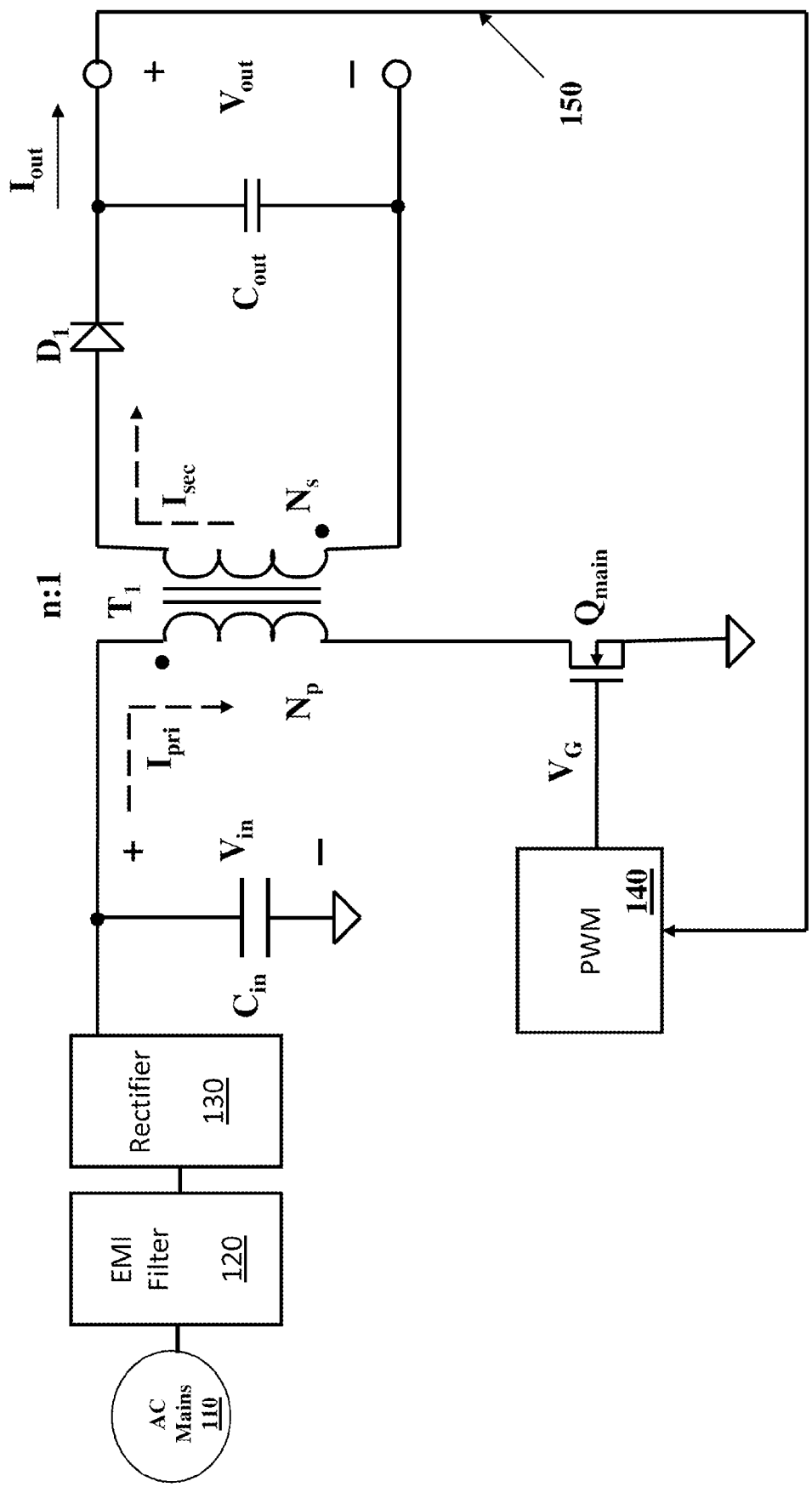
FIG. 1 illustrates a schematic diagram of an embodiment of a power adapter constructed according to the principles of the present invention.

Turning now to FIG. 1, illustrated is a schematic diagram of an embodiment of a power adapter constructed according to the principles of the present invention. A power train (e.g., a flyback power train) of the power converter (also referred to as a "flyback power converter") includes a power switch $Q_{main}$ coupled to an ac mains 110, an electromagnetic interference ("EMI") filter 120 that may include an X-capacitor and a Y-capacitor as described further hereinbelow, a bridge rectifier 130, and an input filter capacitor $C_{in}$ to provide a substantially filtered dc input voltage $V_{in}$ to a magnetic device (e.g., an isolating transformer or transformer $T_1$). Although the EMI filter 120 illustrated in FIG. 1 is positioned between the ac mains 110 and the bridge rectifier 130, the EMI filter 120 may contain filtering components positioned between the bridge rectifier 130 and the transformer $T_1$. The transformer $T_1$ has a primary winding $N_p$ and a secondary winding $N_s$ with a turns ratio n:1 that is selected to provide an output voltage $V_{out}$ with consideration of a resulting duty cycle and stress on power train components.

The power switch $Q_{main}$ (e.g., an n-channel field-effect transistor) is controlled by a pulse-width modulator ("PWM") controller 140 that controls the power switch $Q_{main}$ to be conducting for a duty cycle. The power switch $Q_{main}$ conducts in response to gate drive signal $V_G$ produced by the PWM controller 140 with a switching frequency (often designated as "$f_s$"). The duty cycle is controlled (e.g., adjusted) by the PWM controller 140 to regulate an output characteristic of the power converter such as an output voltage $V_{out}$, an output current $I_{out}$, or a combination thereof. A feedback path 150 enables the PWM controller 140 to control the duty cycle to regulate the output characteristic of the power converter. Of course, as is well known in the art, a circuit isolation element such as an opto-isolator may be employed in the feedback path 150 to maintain input-output isolation of the power converter. The ac voltage appearing on the secondary winding $N_s$ of the transformer $T_1$ is rectified by the diode $D_1$, and the dc component of the resulting waveform is coupled to the output through the low-pass output filter including an output filter capacitor $C_{out}$ to produce the output voltage $V_{out}$.

During a first portion of the duty cycle, a current $I_{pri}$ (e.g., an inductor current) flowing through the primary winding $N_p$ of the transformer $T_1$ increases as current flows from the input through the power switch $Q_{main}$. During a complementary portion of the duty cycle (generally co-existent with a complementary duty cycle 1-D of the power switch $Q_{main}$), the power switch $Q_{main}$ is transitioned to a non-conducting state. Residual magnetic energy stored in the transformer $T_1$ causes conduction of current through the diode $D_1$ when the power switch $Q_{main}$ is off. The diode $D_1$, which is coupled to the output filter capacitor $C_{out}$, provides a path to maintain continuity of a magnetizing current of the transformer $T_1$. During the complementary portion of the duty cycle, the magnetizing current flowing through the secondary winding $N_s$ of the transformer $T_1$ decreases. In general, the duty cycle of the power switch $Q_{main}$ may be controlled (e.g., adjusted) to maintain a regulation of or regulate the output voltage $V_{out}$ of the power converter.

In order to regulate the output voltage $V_{out}$, a value or a scaled value of the output voltage $V_{out}$ is typically compared with a reference voltage in the PWM controller 140 using an error amplifier (not shown) to control the duty cycle. This forms a negative feedback arrangement to regulate the output voltage $V_{out}$ to a (scaled) value of the reference voltage. A larger duty cycle implies that the power switch $Q_{main}$ is closed for a longer fraction of the switching period of the power converter.

As introduced herein, no-load (also referred to as light or reduced load) losses of a power adapter are addressed. In one embodiment, a power converter of the power adapter (i.e., power conversion circuitry coupled to the dc side of a bridge rectifier that rectifies an ac mains voltage) is substantially disconnected when the adapter receives a signal from an external source such as from a load coupled to the adapter. For example, a personal computer may transmit a signal to the adapter indicating that the adapter should enter a no-load operational condition. In response to the signal, the adapter disconnects the power converter of the adapter by opening a switch such as a metal-oxide semiconductor field-effect transistor ("MOSFET"). Disconnecting the power converter of the adapter removes substantial losses associated with the adapter other than losses that may be incurred by a bleeder resistor for an X-capacitor.

In another embodiment, an active bleeder is coupled across an X-capacitor of a power adapter. When an ac mains voltage is supplied to the adapter, the active bleeder is turned off. When the ac mains voltage is turned off, the active bleeder is turned on to quickly discharge the X-capacitor. Using an active bleeder removes a substantial portion of the losses incurred by the bleeder resistor for the X-capacitor.

As introduced herein, an active bleeder senses discharge of a capacitor such as a high-voltage capacitor that signals the presence of the ac mains voltage. Discharge of the capacitor occurs when the ac mains voltage is removed from ac mains coupled to the adapter. The power adapter may sense a removal of an ac mains voltage via pulse detector(s), such as a pulse detector responsive to a fundamental frequency of the ac mains voltage to the adapter or a harmonic thereof. Each pulse detector is coupled to a respective rectifier diode that in turn is coupled to an ac mains terminal. Loss of the pulse train produced by either diode coupled to the ac mains terminal is taken as an indication of removal of the ac mains voltage to the adapter, and an active bleeder (e.g., a bleeder MOSFET) coupled across an X-capacitor is turned on. Each of the two diodes produces its own pulse train in response to the ac mains voltage. A single charged X-capacitor may not by itself produce a reliable signal indicative of presence of an ac mains voltage. By requiring both diodes to produce its respective pulse train, the circuit requires both the hot and neutral terminals to regularly have a positive high voltage to keep the pulse trains active, which can only happen when the ac mains voltage switches polarity on a regular basis (i.e., a false signal is not produced by presence of a dc voltage on a capacitor to indicate presence of the ac mains voltage). Thus, a detection circuit for an active bleeder may be configured to detect loss of ac mains voltage employing a plurality of diodes adapted to sense both polarities of the ac mains voltage.

Figure 2:
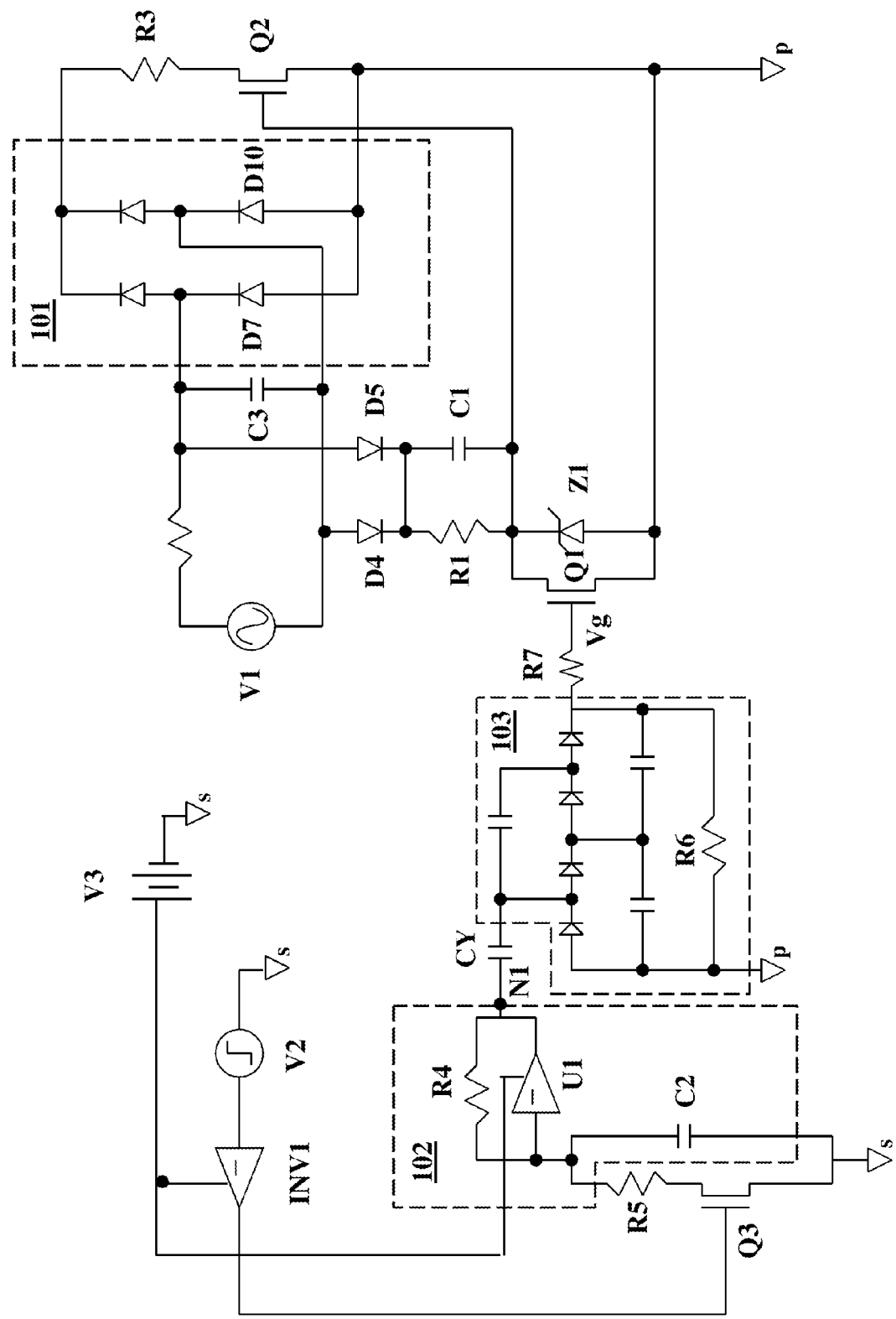
FIG. 2 illustrates a schematic drawing of a portion of an embodiment of a power adapter constructed according to the principles of the present invention.

Turning now to FIG. 2, illustrated is a schematic drawing of a portion of an embodiment of a power adapter constructed according to the principles of the present invention. The power adapter includes a disconnect switch Q2 that removes substantially all losses associated with the power adapter other than losses incurred by a bleeder resistor R1 associated with a capacitor (e.g. an X-capacitor C3). A resistor R3 represents the power drain of an isolated power converter coupled to a bridge rectifier 101, including its no-load drain, and a load coupled to the power converter, such as a personal computer including a battery. Thus, even if the personal computer is disabled or disconnected from the adapter, the resistor R3 represents a positive power drain due to the high-frequency switching action of the power converter in the power adapter as well as active control components in the power converter.

The disconnect switch (e.g., MOSFET) Q2 is the disconnect switch for the resistor R3. A pair of diodes D4, D5 charge a high-voltage capacitor C1 to the peak of the ac mains voltage V1. The bleeder resistor R1 and a zener diode Z1 produce a 12 volt source coupled to the gate of the disconnect switch Q2 that turns on the disconnect switch Q2 in response to the ac mains voltage V1 to the adapter.

When the load such as the personal computer enters a no-load or shut-down operational mode, it produces a secondary-side (i.e., load-side) signal V2 at a high level, such as greater than three volts, to signal turn-off of a switch (e.g., MOSFET) Q3. Turning off the switch Q3 by the secondary-side signal V2 coupled to an inverter INV1 enables operation of an oscillator (e.g., a relaxation oscillator 102) formed by an inverting Schmitt trigger U1, a resistor R4 and a capacitor C2 (e.g., a 10 nanofarad capacitor). The inverting Schmitt trigger U1 produces a high output signal in response to a low input signal. The secondary-side relaxation oscillator 102 when it is enabled by turning off the switch Q3 produces a 3.3 volt square wave at its output at circuit node N1, which passes across the high-voltage boundary between primary and secondary grounds of the adapter (wherein the primary and secondary grounds are indicated by a "p" or "s" adjacent to a ground symbol) through a Y-capacitor CY. A voltage doubler 103 then boosts and rectifies this square-wave voltage to a dc level of about 6.6 volts. The 6.6 volt dc level turns on a power switch (e.g., a MOSFET) Q1 which shorts the 12 volt source (across the zener diode Z1) coupled to the gate of the disconnect switch Q2, thereby turning off the disconnect switch Q2. The voltage doubler 103 may be omitted if the square wave produced at the circuit node N1 is of sufficient amplitude to turn on the power switch Q1. The inverter INV1 and the inverting Schmitt trigger U1 are coupled to an independent power source of the load (e.g., a battery V3 of a personal computer).

Figure 4:
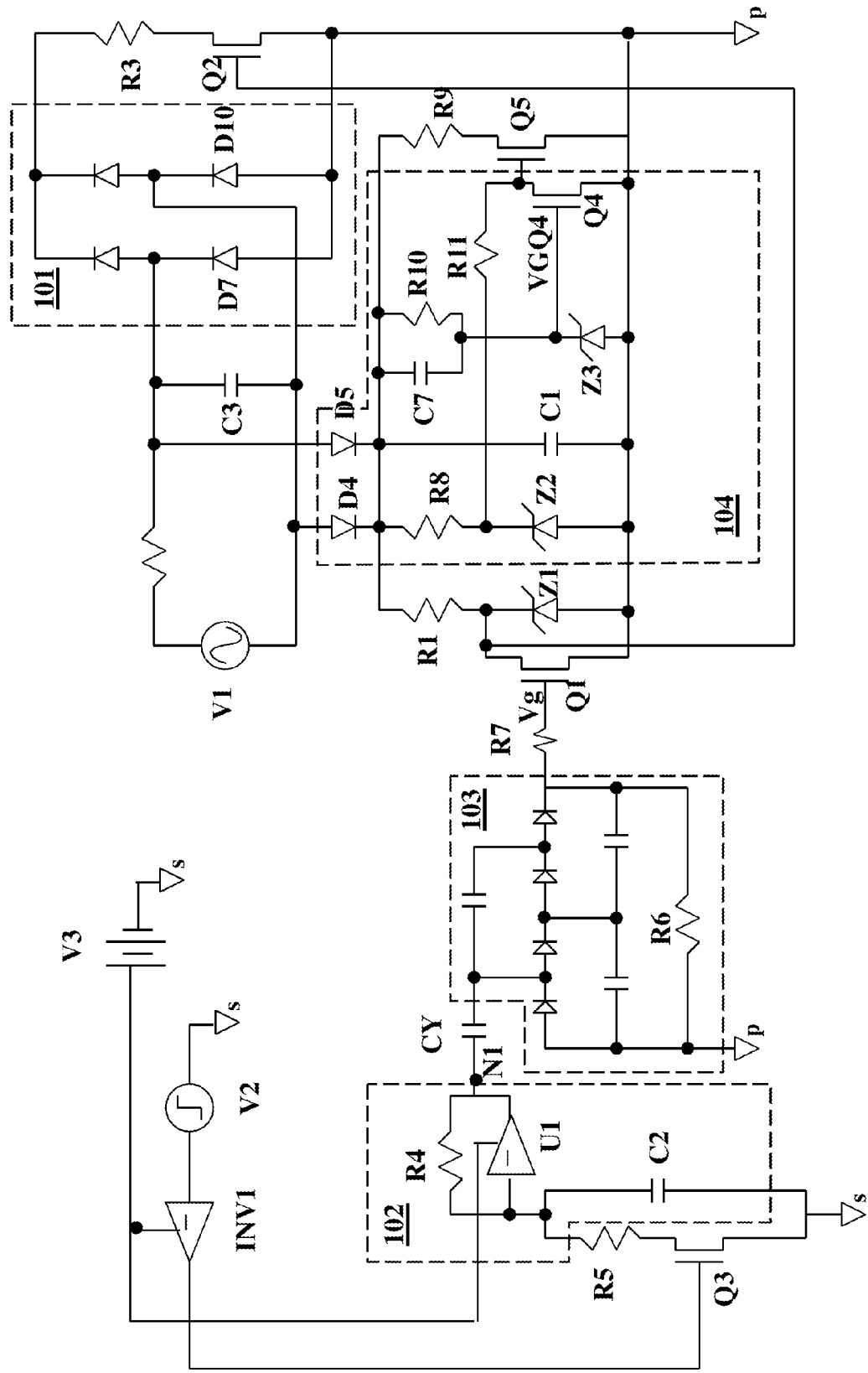
FIG. 4 illustrates a schematic drawing of a portion of an embodiment of a power adapter constructed according to the principles of the present invention.

Although the power adapter illustrated in FIG. 2 and that illustrated and described herein later with reference to FIG. 4 are constructed with a signal-coupling capacitor (e.g., Y-capacitor CY) to transmit a signal across the isolation boundary between primary- and secondary-side grounds, in an alternative embodiment, another isolation component such as a pulse transformer or an opto-isolator may be employed, as is well known in the art, to transmit the square-wave signal (or other waveform) across the isolation boundary. The Y-capacitor CY illustrated in FIGS. 2 and 4 provides a low-cost and energy-efficient mechanism to transmit the square-wave signal.

The load such as a personal computer will generally include a battery that is able to power internal load circuitry. When the power adapter is disabled by the load, the load may re-enable operation of the power adapter by setting the secondary-side signal V2 low. Such a signal produced by the load to turn the power adapter back on may be transmitted when the load enters a state of active use, or when its battery may need to be recharged. The disconnect switch Q2 on the dc side of the bridge rectifier 101 of the power adapter is configured to disconnect the ac mains voltage V1 from the power converter in response to the secondary-side signal V2 from the load containing an independent power source (e.g., battery V3). The independent power source in the load (e.g., battery V3) provides signal power for circuitry in the power adapter that may be used to enable disconnecting or reconnecting the ac mains voltage V1. For example, this signal power provided by the load may be employed to power circuitry such as the relaxation oscillator 102 (e.g., the inverting Schmitt trigger U1 thereof) and the inverter INV1. The disconnect switch Q2 is configured to connect the ac mains voltage V1 to the power converter when the independent power source is unable to provide the signal power.

The secondary-side circuit elements illustrated in FIG. 2 before the power switch Q1 (i.e., before the gate of the power switch Q1) are assumed to be powered by the load coupled to the power adapter. If the battery V3 in the load is discharged so that the load is inoperable without the power adapter, the relaxation oscillator 102 will not be powered. As a result, no signal will be produced at the gate of power switch Q1, independent of the secondary-side signal V2. Accordingly, when a battery V3 in the load is fully discharged, a 12 volt bias will be produced across the zener diode Z1, and the presence of ac mains voltage V1 will enable the disconnect switch Q2 to be turned on, enabling the battery V3 in the load to be recharged. To disable the disconnect switch Q2 when the battery V3 in the load is charged, the secondary-side signal V2 is set to a high value.

The power adapter illustrated in FIG. 2 provides a one nanofarad Y-capacitor CY coupled across the high-voltage boundary between the primary and secondary grounds. A smaller capacitor can be used if the relaxation oscillator frequency is increased. For instance, a 100 picofarad Y-capacitor CY operating at 50 kilohertz ("kHz") with a 2.2 nanofarad value for the capacitor C2, and a 10 kilohm ("kΩ") value for the resistor R4 as relaxation oscillator 102 timing components may be employed to advantage. When the personal computer or other load exits a low-power or zero-power operational mode, it sets the secondary-side signal V2 low. The relaxation oscillator 102 is then disabled, which turns off the power switch Q1. Turning off the power switch Q1 allows the voltage of the zener diode Z1 to float back up to 12 volts, which then turns on the disconnect switch Q2, thereby enabling power to be supplied to the load. The gate voltage of the power switch Q1 is represented by Vg, and the ac mains voltage V1 coupled to the power converter powers the load such as a personal computer or a battery V3 therein that may need to be charged.

Exemplary component values for circuit elements illustrated in FIG. 2 are listed below.

| Component | Exemplary Values |
| --- | --- |
| R1 | 2.8 megohms ("MΩ") |
| R3 | a value representing a load and power converter losses is 105 kilohms ("kΩ") |
| R4 | 330 kΩ |
| R5 | 1 kΩ |
| R6 | 10 MΩ |
| R7 | 1 kΩ |
| Z1 | 12 V |
| CY | 1 nanofarad ("nF") |
| C1 | 1 nF |
| C2 | 100 pF |
| C3 | 330 nF |
| Capacitors in voltage doubler 103 | 1 nF |

Figure 3:
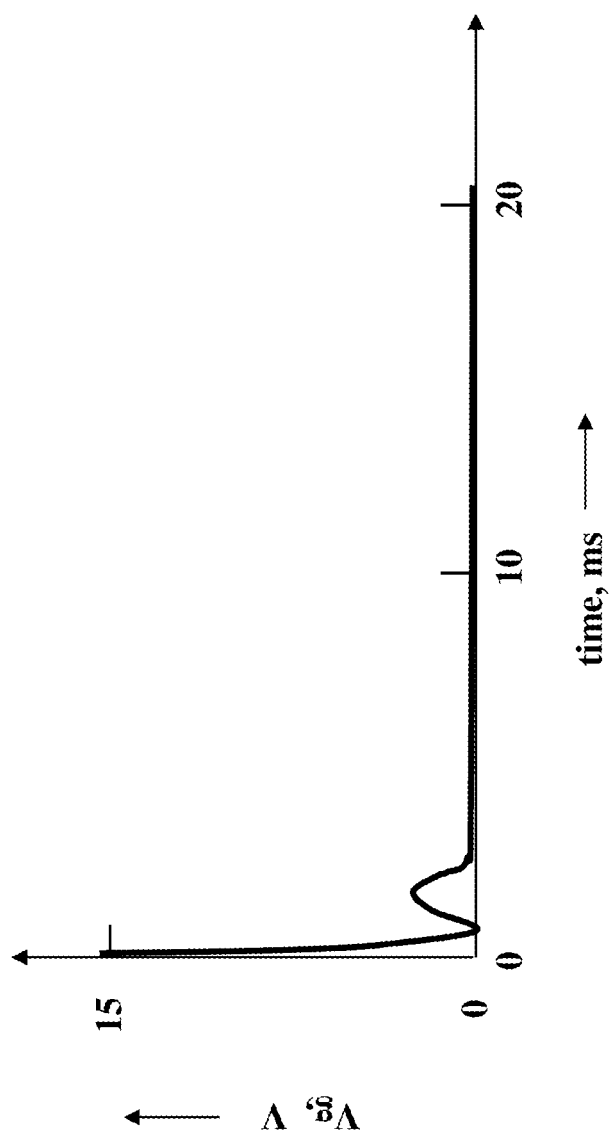
FIG. 3 illustrates a graph showing selected voltages of the power adapter of FIG. 2.

Turning now to FIG. 3, illustrated is a graph showing selected voltages of the power adapter of FIG. 2. The graph shows a gate voltage Vg of the power switch Q1 via the resistor R7, which is on the primary side of the power adapter after the oscillator signal. When the disconnect switch Q2 is on, the power consumed by the exemplary adapter is 727 milliwatts ("mW"). When the disconnect switch Q2 is off, the power consumed by the exemplary adapter is 26 mW. The 26 mW power level is determined by the bleeder resistor R1. The 727 mW power level is the sum of the 26 mW consumed by the bleeder resistor R1 and whatever quiescent load is on the dc side of the bridge rectifier 101, represented here by the resistor R3. In many adapter designs, the equivalent value of the resistor R3 can be much higher due to inclusion of a burst mode of operation. If a burst mode of operation is included, the 727 mW number would be reduced. The 26 mW power level is determined by the size of X-capacitor C3 and safety requirements that prescribe its rate of discharge.

When the ac mains voltage V1 is disconnected, the X-capacitor C3 (parallel-coupled to the ac mains at an input of the power adapter) discharges through the bleeder resistor R1, zener diode Z1, and either diodes D5, D10 or diodes D4, D7, depending on the polarity of the voltage across X-capacitor C3. The bleeder resistor R1 discharges the X-capacitor C3 to a voltage below about 37 percent of its original value in less than one second to satisfy a common safety requirement.

Turning now to FIG. 4, illustrated is a schematic drawing of a portion of an embodiment of a power adapter constructed according to the principles of the present invention. An active bleeder of the power adapter is formed with a detection circuit 104 to detect the presence of ac mains voltage V1, and with an additional 12 volt supply formed with a resistor R8 and a zener diode Z2 derived from the same high-voltage capacitor C1 that is used by the original 12 volt supply illustrated and described with reference to FIG. 2. In addition, a bleeder switch (e.g., a MOSFET) Q5 is included and a current-limiting bleeder resistor R9. An inverter is formed by a switch (e.g., MOSFET) Q4 and a resistor R11, which is supplied by the added 12 volt supply. A coupling circuit is formed by a capacitor C7, a resistor R10, and a zener diode (e.g., a 12 voltage zener diode) Z3. In the power adapter illustrated in FIG. 4, the bleeder resistor R1 illustrated in FIG. 2 is now increased to 100 MΩ. While the resistance of the bleeder resistor R1 is too high to rapidly discharge the X-capacitor C3, the bleeder switch Q5 in series with the current-limiting bleeder resistor R9 enables the parallel-coupled X-capacitor C3 to be discharged in acceptable time such as less than one second.

The bleeder switch Q5 is included in series with the current-limiting bleeder resistor R9 to actively bleed the X-capacitor C3 rapidly. During normal operation, the added 12 volt supply keeps the switch Q4 on. Therefore, the bleeder switch Q5 is held in an off state. The power adapter operates as before, except that the bleeder current is substantially reduced during an off state. The no-load power is now reduced to only 5 mW when the disconnect switch Q2 is off. When the ac mains voltage V1 is disconnected, the two 12 volt supplies draw current from the high-voltage capacitor C1 and the X-capacitor C3, causing a slow discharge thereof. The capacitor C7 acts as a coupling capacitor, causing the voltage change (e.g., decline) on the high-voltage capacitor C1 to appear at the gate of the switch Q4. When the voltage across the high-voltage capacitor C1 declines by about nine volts, the gate voltage VGQ4 of the switch Q4 declines from 12 volts to three volts. The switch Q4 then turns off, which turns on the bleeder switch Q5 and quickly discharges the high-voltage capacitor C1 and the X-capacitor C3. The detection circuit detects the loss of the ac mains voltage V1 by sensing a voltage or a change thereof across the high-voltage capacitor C1. The voltage of the gate of the switch Q4 may, for example, exhibit a ripple voltage in the range of five to nine volts at a high ac mains voltage (e.g., 264 volts root mean square ("V RMS")) V1. At lower ac mains voltages V1, the ripple voltage at the gate of the switch Q4 will be proportionately less. The zener diode Z3 limits the gate voltage VGQ4 of the switch Q4 to about 12 volts. Thus, the detection circuit 104 is configured to detect the loss of ac mains voltage V1 by sensing a voltage across the X-capacitor C3 with a peak detector (e.g., diodes D4, D5 and high-voltage capacitor C1), and a change of voltage of the peak detector is sensed employing the coupling capacitor C7 and the switch Q4.

Exemplary component values for circuit elements illustrated in FIG. 4 are listed below.

| Component | Exemplary Values |
|---|---|
| R1 | 100 MΩ |
| R8 | 100 MΩ |
| Z2, Z3 | 12 V |
| R9 | 10 kΩ |
| R10 | 330 MΩ |
| R11 | 4.7 MΩ |
| C7 | 100 nF |

Exemplary component values for other elements illustrated in FIG. 4 are the same as those described with reference to FIG. 2. In accordance therewith, like components in FIGS. 2 and 4 are referred to using the same reference designations. As illustrated in FIG. 4, the X- and Y-capacitors C3, CY, the bleeder resistors R1, R9, the bleeder switch Q5, the relaxation oscillator 102, the voltage doubler 103, the detection circuit 104 and the disconnect switch Q2 form at least a portion of a power reducer for the power adapter.

Figure 5:
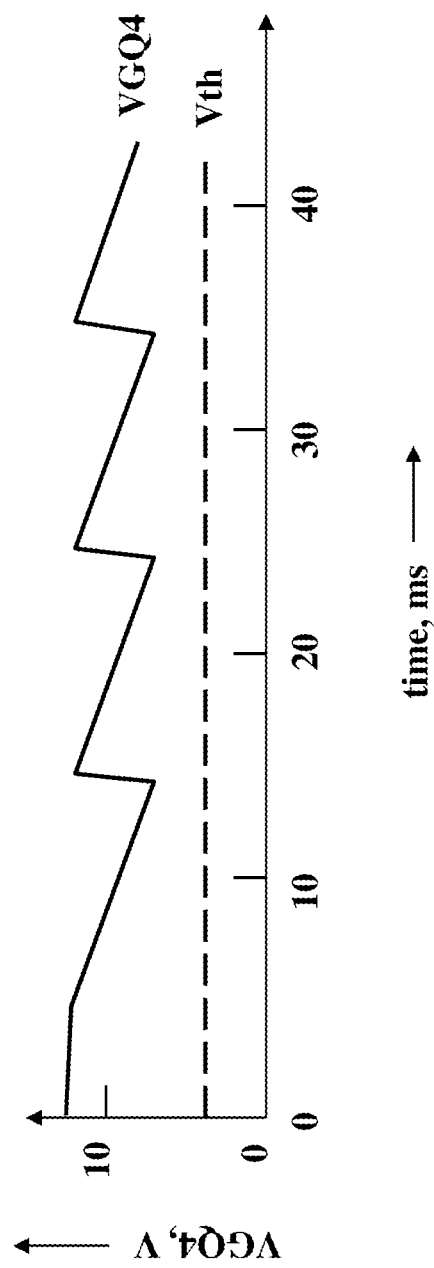
FIGS. 5, 6A and 6B illustrate graphs showing selected voltages of the power adapter of FIG. 4.

Turning now to FIG. 5, illustrated is a graph showing selected voltages of the power adapter of FIG. 4. The graph shows the gate voltage VGQ4 of the switch Q4 with normal operation of the power adapter at a high ac mains voltage V1 of 264 volts alternating current ("VAC"). The gate voltage VGQ4 at the gate of the switch Q4 exhibits a sawtooth ripple waveform voltage with a peak-to-peak ripple voltage of about five volts and a frequency double the ac mains frequency. The gate voltage VGQ4 remains above a threshold voltage Vth of the switch Q4, which results in the switch Q4 remaining on continuously during normal application of an ac mains voltage V1. As a result, the bleeder switch Q5 remains off continuously. Accordingly, no power is dissipated in the current-limiting bleeder resistor R9 during normal operation of the power adapter when an ac mains voltage V1 is applied.

Figure 6:
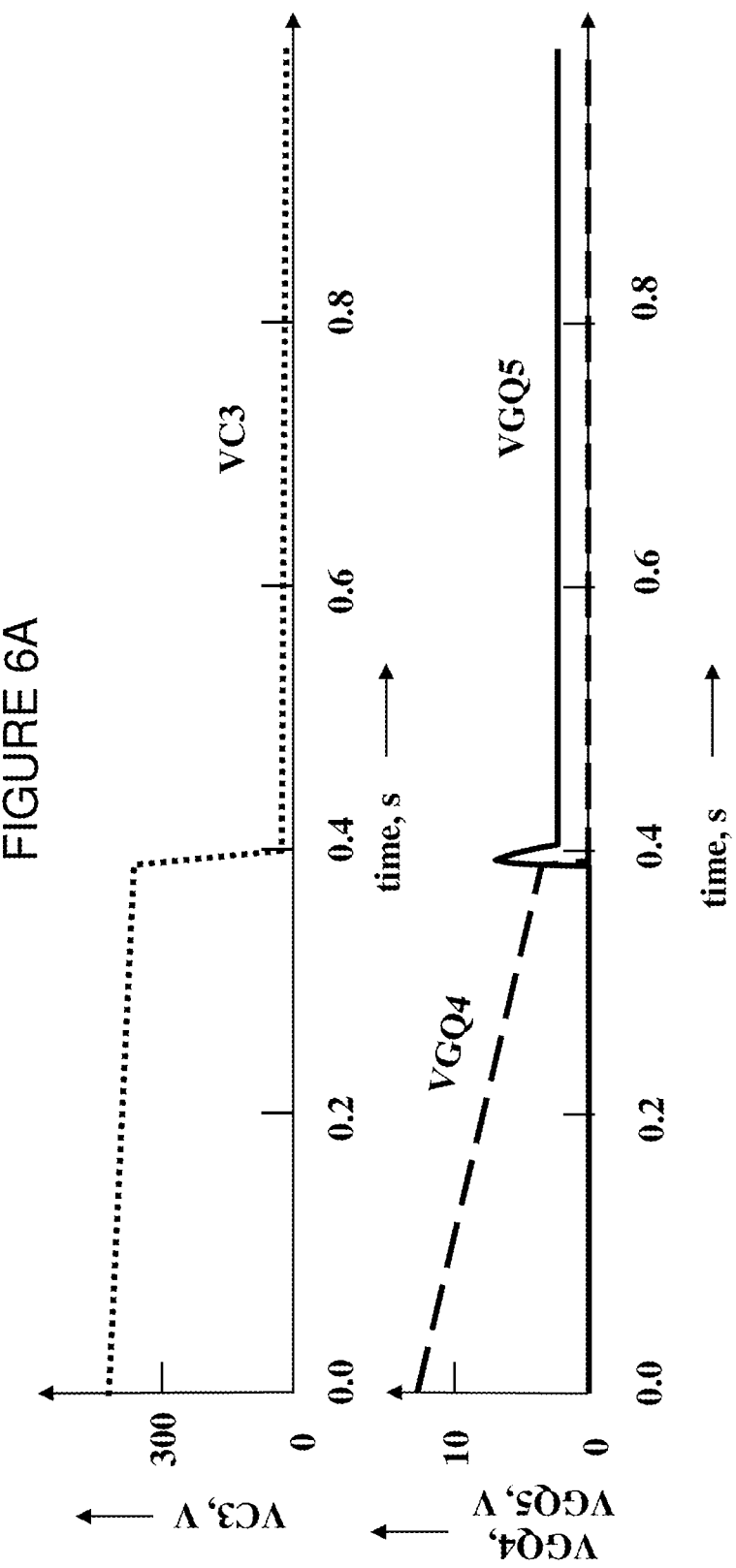

Turning now to FIGS. 6A and 6B, illustrated is a graph showing selected voltages of the power adapter of FIG. 4. The graph shows a voltage VC3 (dotted line) across the X-capacitor C3 (see FIG. 6A), and a gate voltage VGQ4 (dashed line) at the gate of the switch Q4 and a gate voltage VGQ5 (solid line) at the gate of the bleeder switch Q5 (see FIG. 6B), illustrating active-bleeder operation of the power adapter when the ac mains voltage V1 is disconnected at time 0. When the ac mains voltage V1 is disconnected at time 0, the gate voltage VGQ4 at the gate of the switch Q4 declines fairly slowly until it reaches the threshold voltage of the switch Q4 at approximately 0.4 seconds ("s"). At this time, the switch Q4 turns off, causing the gate voltage VGQ5 of the bleeder switch Q5 to rise, turning on the bleeder switch Q5. The turn-on of the bleeder switch Q5 causes the rapid discharge of the X-capacitor C3 through the current-limiting bleeder resistor R9, as illustrated by the voltage VC3 across the X-capacitor C3 in FIG. 6A. Prior to the turn-on of the bleeder switch Q5 at approximately 0.4 seconds, the voltage VC3 across the X-capacitor C3 only slowly decays through the resistors R1, R8, R10 and the zener diodes Z1, Z2, Z3.

The active bleeder circuit described hereinabove can be used without a disconnect switch such as the disconnect switch Q2. However, the circuits illustrated in FIGS. 2 and 4 share common circuit elements, and each may reduce no-load losses by similar orders of magnitude. Accordingly, both circuits can be advantageously used to reduce no-load (or light load) losses.

In a further embodiment, a start-up circuit produces an initial bias voltage for the power adapter and also discharges a capacitor such as an X-capacitor coupled across the ac mains upon loss of ac mains voltage. Upon a loss of the ac mains voltage, a residual voltage can remain across a capacitor coupled to input terminals of a power adapter, which presents a possible safety risk to an end user that might unplug the power adapter and touch exposed pins of its ac plug. Accordingly, a circuit element such as a resistor is generally included in the power adapter to discharge the capacitor. However, as described previously hereinabove, such a resistor when continuously coupled to the capacitor produces undesirable power dissipation within the power adapter. In an embodiment, a resistor-capacitor time constant is employed to initiate discharge of the capacitor upon a loss of the ac mains voltage.

Figure 7:
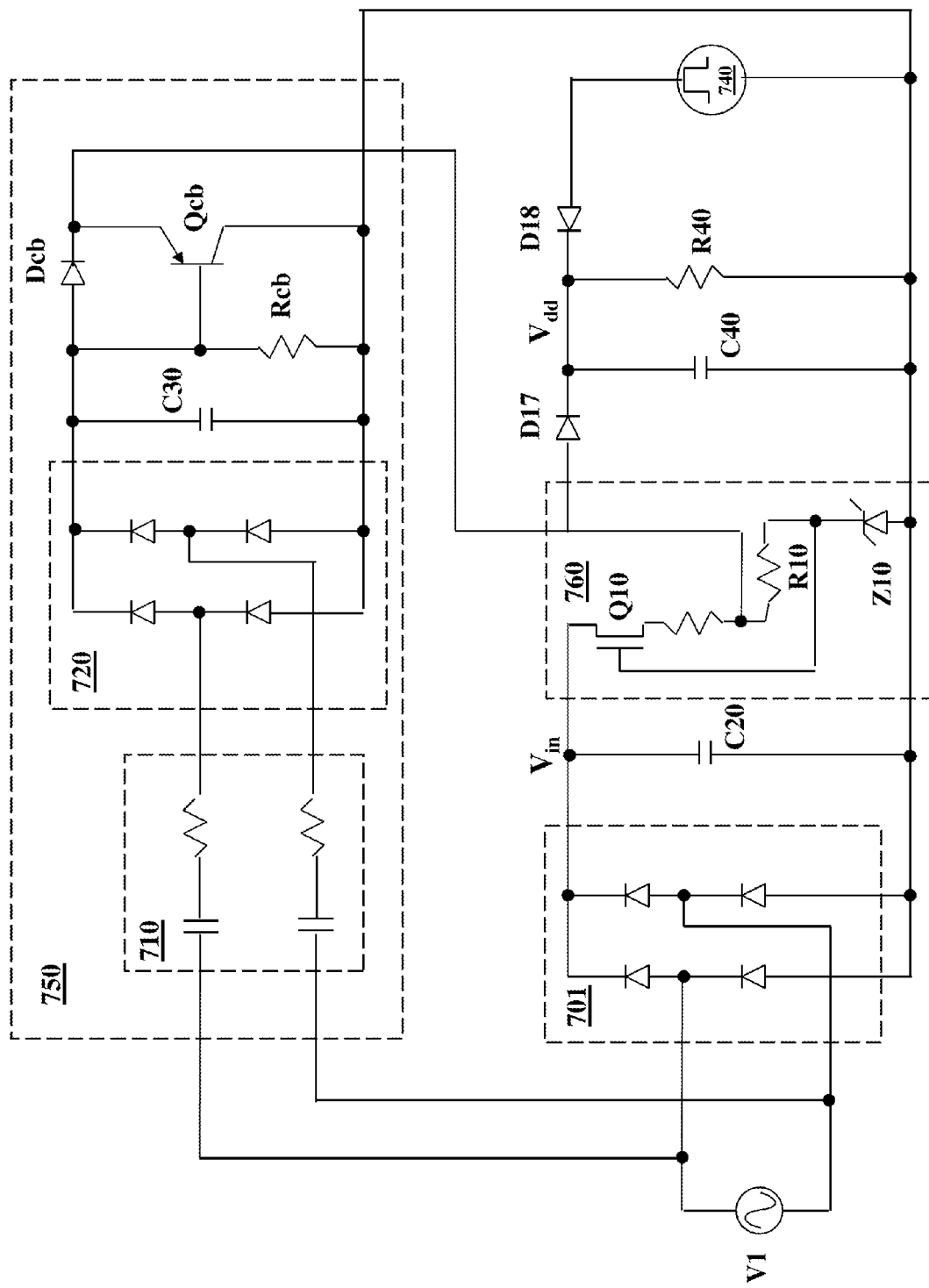
FIG. 7 illustrates a schematic drawing of an embodiment of portions of a power adapter formed with a start-up circuit and a crowbar circuit configured constructed according to the principles of the present invention.

Turning now to FIG. 7, illustrated is a schematic drawing of an embodiment of portions of a power adapter formed with start-up circuit 760 and crowbar circuit 750 configured to discharge a capacitor C20 (e.g., an X-capacitor) coupled across the ac mains. An ac mains voltage V1 is coupled to a diode bridge 701 to produce a rectified input voltage $V_{in}$. The capacitor C20 is coupled across dc terminals of the diode bridge 701. The start-up circuit 760 formed with a switch (e.g., a MOSFET) Q10 is coupled across the capacitor C20 and includes a resistor R10 series-coupled to a non-control terminal (e.g., a source terminal) of the switch Q10 to provide a substantially constant-current bias voltage source for the power adapter. In an embodiment, the start-up circuit 760 may be a double-diffused metal-oxide semiconductor ("DMOS") start-up circuit (or cell) wherein the switch Q10 is a DMOS transistor. The resulting bias voltage is coupled to a bias voltage filter capacitor C40 through a diode D17 to produce a bias voltage $V_{dd}$.

When a switching action of the power converter is initiated, a high-frequency internal bias voltage source 740 is rectified by a diode D18 and coupled to the bias voltage filter capacitor C40. A resistor R40 represents a bias load of the power adapter that is powered by the bias voltage $V_{dd}$. When the bias voltage $V_{dd}$ is produced by the high-frequency internal bias voltage source 740, it is generally several volts higher than when the bias voltage $V_{dd}$ is produced by the start-up circuit 760. A zener diode Z10 (e.g., a ten volt zener diode) is operable to disable the start-up circuit 760 when the bias voltage $V_{dd}$ is greater than a threshold value, such as 12 volts, thereby eliminating unnecessary power dissipation in the power adapter. Thus, the start-up circuit 760 provides the bias voltage $V_{dd}$ when the bias voltage $V_{dd}$ provided by the high-frequency internal bias voltage source 740 of the power adapter is less than a threshold value.

The ac mains voltage V1 is also coupled to a crowbar circuit 750 that turns on the start-up circuit 760 upon loss of the ac mains voltage V1. The crowbar circuit 750 is formed with resistor-capacitor network 710 that is coupled to a capacitor C30 through a diode bridge 720. A crowbar switch Qcb (e.g., an npn bipolar transistor) is coupled to the capacitor C30 through a diode Dcb. When sufficient ac mains voltage V1 is present, the resulting voltage produced across the capacitor C30 is sufficient to turn off the crowbar switch Qcb. However, when the ac mains voltage V1 is disconnected or is of insufficient amplitude, the crowbar switch Qcb is enabled to conduct by a resistor Rcb coupled between a control terminal and a non-control terminal (e.g., the base and collector) of the crowbar switch Qcb. The resulting conduction of the crowbar switch Qcb turns on the start-up circuit 760 to discharge the capacitor C20. A diode D17 isolates the bias voltage filter capacitor C40 from the crowbar circuit 750.

Thus, in an embodiment, a bleeder resistor for discharging a capacitor (e.g., an X-capacitor) is replaced with a start-up circuit such as a DMOS start-up circuit that is ordinarily employed to just provide an initial bias voltage for a power adapter or other electronic circuit. A crowbar circuit turns on a switch to bleed charge (via the start-up circuit) from the capacitor upon loss of ac mains voltage. A switch and a source resistor are configured as a substantially constant-current bias voltage source. The start-up circuit includes a zener diode to turn off the switch when the power adapter initiates its switching action. As long as ac mains voltage is above a threshold level, such as a root-mean square ("RMS") value of the ac mains voltage greater than 100 Vac for a nominal 120 Vac mains, and an internal bias voltage is present, the start-up circuit is turned off. If the ac mains voltage is lost, then the start-up circuit is turned on by a crowbar circuit. The start-up circuit is thus used for two purposes. One is to start up an initial bias voltage, and the other is to bleed off charge from a capacitor coupled across ac input terminals of the power adapter when there is a loss of ac mains voltage supplied to the power adapter or if the ac mains voltage drops too low to turn on the start-up circuit.

Thus, a start-up circuit for a power adapter and method of operating the same have been introduced herein. In one embodiment, the power adapter includes a start-up circuit (e.g., a DMOS start-up circuit) configured to provide an initial bias voltage for the power adapter. The power adapter also includes a crowbar circuit configured to turn on the start-up circuit upon loss of an ac mains voltage supplied to the power adapter. The start-up circuit is configured to provide the initial bias voltage when a bias voltage of the power adapter is less than a threshold value. The start-up circuit is operable to discharge a capacitor (e.g., an X-capacitor) coupled across input terminals of the power adapter. The start-up circuit includes a switch (e.g., a MOSFET) and resistor coupled (e.g., series-coupled to a source of the MOSFET) thereto configured to provide a substantially constant-current bias voltage source. The start-up circuit is coupled to the ac mains voltage via a diode bridge and employs the ac mains voltage to provide the initial bias voltage. The crowbar circuit is configured to turn on the start-up circuit when the ac mains voltage falls below a threshold level. The crowbar circuit includes a resistor-capacitor network coupled to the ac mains voltage via a diode bridge. The crowbar circuit includes a switch (e.g., a bipolar transistor) coupled to a capacitor through a diode, and is isolated from a bias voltage filter capacitor by a diode.

Those skilled in the art should understand that the previously described embodiments of a power adapter including circuits to reduce no-load (or light load) losses and related methods of operating the same are submitted for illustrative purposes only. For example, in a further embodiment, a power adapter that uses a half-wave bridge instead of full-wave bridge can use techniques described herein. For example, full-wave bridge 101 illustrated in FIGS. 2 and 4 could be replaced with a single diode, eliminating the need for the diode D4. While a power adapter employing a power converter including circuits to reduce no-load (or light load) losses has been described in the environment of a power converter, these processes may also be applied to other systems such as, without limitation, a power amplifier or a motor controller.

For a better understanding of power converters, see "Modern DC-to-DC Power Switch-mode Power Converter Circuits," by Rudolph P. Severns and Gordon Bloom, Van Nostrand Reinhold Company, New York, N.Y. (1985) and "Principles of Power Electronics," by J. G. Kassakian, M. F. Schlecht and G. C. Verghese, Addison-Wesley (1991). For related applications, see U.S. Patent Application Publication No. 2008/0130321, entitled "Power Converter with Adaptively Optimized Controller and Method of Controlling the Same," to Artusi, et al., published Jun. 5, 2008, U.S. Patent Application Publication No. 2008/0130322, entitled "Power System with Power Converters Having an Adaptive Controller," to Artusi, et al., published Jun. 5, 2008, and U.S. Patent Application Publication No. 2008/0232141, entitled "Power System with Power Converters Having an Adaptive Controller," to Artusi, et al., published Sep. 25, 2008. The aforementioned references are incorporated herein by reference in their entirety.

Also, although the present invention and its advantages have been described in detail, it should be understood that various changes, substitutions and alterations can be made herein without departing from the spirit and scope of the invention as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A power adapter, comprising:
a start-up circuit configured to provide an initial bias voltage for said power adapter; and
a crowbar circuit configured to turn on said start-up circuit upon loss of an ac mains voltage supplied to said power adapter.

2. The power adapter as recited in claim 1 wherein said start-up circuit comprises a switch and resistor coupled thereto configured to provide a substantially constant-current bias voltage source.

3. The power adapter as recited in claim 2 wherein said switch is a metal-oxide semiconductor field-effect transistor and said resistor is series-coupled to a source terminal thereof.

4. The power adapter as recited in claim 1 wherein said start-up circuit employs said ac mains voltage to provide said initial bias voltage.

5. The power adapter as recited in claim 1 wherein said start-up circuit is coupled to said ac mains voltage via a diode bridge.

6. The power adapter as recited in claim 1 wherein said crowbar circuit is configured to turn on said start-up circuit when said ac mains voltage falls below a threshold level.

7. The power adapter as recited in claim 1 wherein said start-up circuit comprises a double-diffused metal-oxide semiconductor start-up cell.

8. The power adapter as recited in claim 1 wherein said crowbar circuit comprises a resistor-capacitor network coupled to said ac mains voltage.

9. The power adapter as recited in claim 1 wherein said crowbar circuit comprises a diode bridge coupled via a resistor-capacitor network to said ac mains voltage.

10. The power adapter as recited in claim 1 wherein said crowbar circuit is isolated from a bias voltage filter capacitor by a diode.

11. The power adapter as recited in claim 1 wherein said crowbar circuit comprises a switch coupled to a capacitor through a diode.

12. The power adapter as recited in claim 11 wherein said switch as a bipolar transistor.

13. The power adapter as recited in claim 1 wherein said start-up circuit is operable to discharge a capacitor coupled across input terminals of said power adapter.

14. The power adapter as recited in claim 12 wherein said capacitor is an X-capacitor.

15. The power adapter as recited in claim 1 wherein said start-up circuit is configured to provide said initial bias voltage when a bias voltage of said power adapter is less than a threshold value.

16. A method, comprising:

providing an initial bias voltage for a power adapter with a start-up circuit; and turning on said start-up circuit upon loss of an ac mains voltage supplied to said power adapter.

17. The method as recited in claim 16 wherein said start-up circuit provides a substantially constant-current bias voltage source.

18. The method as recited in claim 16 wherein said turning on said start-up circuit comprises turning on said start-up circuit when said ac mains voltage falls below a threshold level.

19. The method as recited in claim 16 furthering comprising discharging a capacitor coupled across input terminals of said power adapter.

20. The method as recited in claim 16 wherein providing said initial bias voltage comprises providing said initial bias voltage when a bias voltage of said power adapter is less than a threshold value.

* * * * *